(12) United States Patent
Akutsu et al.

(10) Patent No.: US 7,953,947 B2
(45) Date of Patent: May 31, 2011

(54) CREATING A SNAPSHOT BASED ON A MARKER TRANSFERRED FROM A FIRST STORAGE SYSTEM TO A SECOND STORAGE SYSTEM

(75) Inventors: Hiroaki Akutsu, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/786,464

(22) Filed: May 25, 2010

(65) Prior Publication Data

US 2010/0235591 A1    Sep. 16, 2010

Related U.S. Application Data

(63) Continuation of application No. 11/527,446, filed on Sep. 27, 2006, now Pat. No. 7,725,668.

(30) Foreign Application Priority Data

Aug. 4, 2006    (JP) .................................. 2006-213896

(51) Int. Cl.
    *G06F 12/16*    (2006.01)
(52) U.S. Cl. ................................. 711/162; 711/E12.103
(58) Field of Classification Search .......................... None
    See application file for complete search history.

(56) References Cited

U.S. PATENT DOCUMENTS

| | | | |
|---|---|---|---|
| 6,131,148 A | 10/2000 | West et al. | |
| 6,434,681 B1 | 8/2002 | Armangau | |
| 7,254,683 B2 | 8/2007 | Burton et al. | |
| 7,401,251 B1 | 7/2008 | Haynes et al. | |
| 7,461,100 B2 | 12/2008 | Spear et al. | |
| 7,680,839 B1 * | 3/2010 | Krishnamurthy et al. | .... 711/162 |
| 2002/0178174 A1 | 11/2002 | Wakabayashi | |
| 2004/0153615 A1 | 8/2004 | Koning et al. | |
| 2005/0005070 A1 | 1/2005 | Lam | |
| 2005/0050110 A1 | 3/2005 | Sawdon et al. | |
| 2005/0125609 A1 | 6/2005 | Satoyama et al. | |
| 2005/0172092 A1 | 8/2005 | Lam et al. | |
| 2005/0192991 A1 * | 9/2005 | Nomoto et al. | ............... 707/101 |
| 2006/0018505 A1 | 1/2006 | Cherian et al. | |

(Continued)

FOREIGN PATENT DOCUMENTS

EP    1 628 220    2/2006

OTHER PUBLICATIONS

Disaster Recovery with DB2 UDB for z/OS (Nov. 2004).

(Continued)

*Primary Examiner* — Matt Kim
*Assistant Examiner* — Hal Schnee
(74) *Attorney, Agent, or Firm* — Antonelli, Terry, Stout & Kraus, LLP.

(57) ABSTRACT

A storage system and snapshot method wherein after a first processor transfers data stored in a first data area to a second storage system, the first processor transfers a first marker stored in a first marker area to a second storage system so that the first marker is stored in a second marker area of a second volume, wherein a second processor checks whether the first marker stored in the second storage area of the second volume corresponds to a second marker designated, and wherein, if the first marker stored in the second storage are of the second volume is a second marker designated, the second processor creates a snapshot of the data that is stored in the second data area, in a third storage volume.

10 Claims, 31 Drawing Sheets

U.S. PATENT DOCUMENTS

| | | |
|---|---|---|
| 2006/0069893 A1 | 3/2006 | LeCrone et al. |
| 2006/0143412 A1 | 6/2006 | Armangau |
| 2006/0155946 A1* | 7/2006 | Ji .................................. 711/162 |
| 2006/0179061 A1 | 8/2006 | D'Souza et al. |

OTHER PUBLICATIONS

IBM Totalstorage DS8000 Copy Services with IBM Eserver zSeries (Feb. 2006).

Using Asynchronous Replication for Business Continuity between Two or More Sites (Dec. 2004).

IBM Totalstorage DS8000 Concepts and Architecture (Mar. 2005).

IBM Totalstorage DS8000 Copy Services in Open Environments (Feb. 2006).

IBM Totalstorage DS8000 recovering (Aug. 2006).

IBM Totalstorage DS8000 User's Guide.

* cited by examiner

| PAIR IDENTIFIER | SOURCE VOLUME NAME | TARGET VOLUME NAME | PAIR RELATIONSHIP |
|---|---|---|---|
| 001 | A | B | REMOTE COPY |
| 002 | B | C | LOCAL COPY (DIFFERENCE COPY) |
| ... | ... | ... | ... |

FIG.23

| VOLUME GROUP NAME | TARGET ADDRESS | WRITE-TARGET DATA |
|---|---|---|
| A | 0x0041 | 02 42 00 ··· |
| C | 0x0020 | 9F A3 0E ··· |
| ... | ... | ... |

351A (351B~351D)
352A (352B~352D)
353A (353B~353D)
131A(131B~131D)

ALLOCATE STORAGE EXTENT TO MARKER AREA

CREATING A SNAPSHOT BASED ON A MARKER TRANSFERRED FROM A FIRST STORAGE SYSTEM TO A SECOND STORAGE SYSTEM

CROSS REFERENCE TO RELATED APPLICATION

This is a continuation of U.S. application Ser. No. 11/527,446, filed Sep. 27, 2006 now U.S. Pat. No. 7,725,668. This application relates to and claims priority from Japanese Patent Application No. 2006-213896, filed on Aug. 4, 2006. The entirety of the contents and subject matter of all of the above is incorporated herein by reference.

BACKGROUND

The present invention relates to a storage system and a snapshot creation method thereof.

Conventionally, a computer system that connects a host computer and a storage system with a network, and stores data processed with the host computer in the storage system by sending and receiving such data via the network has been put into practical application.

In this kind of computer system, remote copy technology is known for preventing the loss of data even when a disaster occurs in the storage system of a local site by configuring a volume group of the storage system of the local site and a volume group of the storage system of a remote site in a pair relationship for executing volume-to-volume copy, and copying (replicating) data from the volume group of the local site storage system to the volume group of the remote site storage system.

As background art related to remote copy technology, for instance, IBM REDBOOKS—Disaster Recovery with DB2 UDB for zOS; November 2004, and IBM REDBOOKS—The IBM Total Storage DS8000 Series: Copy Services with IBM Eserver zSeries; February 2006, disclose async remote copy technology for creating a backup of the volume group of the local site storage system in the volume group of the remote site storage system by periodically compiling and transferring the change difference of the volume group of the local site storage system asynchronously to the remote site storage system.

Nevertheless, with the foregoing async remote copy technology, upon transferring the change difference of the volume group of the local site storage system to the volume group of the remote site storage system, consistency regarding the writing sequence by the host computer in the volume or volume group of the local site storage system is not guaranteed.

Thus, with this async remote copy technology, when a disaster or the like occurs in the local site storage system during the transfer of data, such data may be damaged since the consistency of the volume group of the remote site storage system is not guaranteed.

Thus, also disclosed is remote copy technology which combines the async remote copy technology and the local copy technology in order to guarantee the existence of a volume with consistency regarding the writing sequence from the host computer in the remote site storage system at an arbitrary point in time. Specifically, with this remote copy technology, async remote copy is performed from a first volume group of the local site storage system to a second volume group of the remote site storage system, and, after transferring all change differences, local copy is performed from the second volume group to a fourth volume group of the remote site storage system. Like this, by alternately performing async remote copy and local copy, existence of a volume group having consistency will be guaranteed in the fourth volume group when transferring the change difference of the first volume group of the local site storage system to the second volume group of the remote site storage system.

Further, Using Asynchronous Replication for Business Continuity Between Two or More Sites; December 2004 discloses remote copy technology capable of configuring a volume group having consistency regarding the writing sequence from the host computer to the local site storage system even when a disaster or the like occurs in the local site storage system and subsequent data transfer cannot be performed by primarily storing difference data in a difference buffer in the remote site storage system.

Nevertheless, with the foregoing remote copy technology that combines async remote copy technology and local copy technology, when the second volume group and the fourth volume group are used for testing or the like in the remote site storage system during the system operation of the remote copy technology, it is necessary to discontinue the system operation in the remote copy technology until such testing is complete. Further, when data is written in the second volume group and the fourth volume group while such testing is being conducted, there is a possibility that such data cannot be backed up properly.

Thus, it is conceivable to newly prepare a third volume group in the remote site storage system and create a snapshot of the second volume group as the third volume group. Nevertheless, when creating a snapshot of the second volume group as the third volume group, there may be cases where the second volume group is copying the change difference, and, therefore, consistency of the writing sequence from the host computer in the local site storage system will not be guaranteed.

Here, in order to create a snapshot where the consistency is guaranteed, it is necessary to discontinue the system operation in the foregoing remote copy technology, issue a command to the local site for guaranteeing the consistency, create a snapshot of the second volume, and thereafter make the local site issue a command for resuming the system operation in the remote copy technology. Thus, complex operations such as the discontinuance and resumption of the system operation in the remote copy technology are required by the local site storage system, and will affect the system operation.

Moreover, even with the remote copy technology described in Non-Patent Document 3, when creating a snapshot of the second volume group in the remote site storage system during the system operation in the remote copy technology, there may be cases where the consistency is not guaranteed since it may be applying data of the difference buffer.

SUMMARY

The present invention was devised in view of the foregoing points. Thus, an object of the present invention is to propose a computer system and a snapshot creation method thereof capable of a simple and fast system operation.

In order to overcome the foregoing problems, the present invention provides a computer system including a first storage system having a first volume for storing data sent from a host system, and a second storage system having a second volume for storing the data sent from the first storage system. The first storage system comprises a data transfer unit for transferring the data stored in the first volume to the second volume of the second storage system. The second storage system comprises a snapshot creation unit for creating a snapshot of the second volume in a third volume based on a snapshot creation command. When the snapshot creation unit receives the snapshot creation command while transferring the data from the first volume to the second volume with the data transfer unit, the snapshot creation unit delays the creation of the snapshot of the second volume in the third volume until the transfer of the data from the first volume to the second volume is complete.

Accordingly, even when testing or the like is conducted during the operation of the remote copy system, it is possible to effectively prevent complex operations such as the discontinuance or resumption of the system operation from occurring, and create a snapshot having consistency without having to discontinue the system operation.

The present invention further provides a snapshot creation method of a computer system including a first storage system having a first volume for storing data sent from a host system, and a second storage system having a second volume for storing the data sent from the first storage system. The snapshot creation method comprises a first step of transferring the data stored in the first volume to the second volume of the second storage system, and a second step of creating a snapshot of the second volume in a third volume based on a snapshot creation command. At the second step, when the snapshot creation command is received while transferring the data from the first volume to the second volume at the first step, creation of the snapshot of the second volume in the third volume is delayed until the transfer of the data from the first volume to the second volume is complete.

Accordingly, even when testing or the like is conducted during the operation of the remote copy system, it is possible to effectively prevent complex operations such as the discontinuance or resumption of the system operation from occurring, and create a snapshot having consistency without having to discontinue the system operation.

According to the present invention, when the snapshot creation command is received while transferring the data from the first volume to the second volume, creation of the snapshot of the second volume in the third volume is delayed until the transfer of the data from the first volume to the second volume is complete. Therefore, even when testing or the like is conducted during the operation of the remote copy system, it is possible to effectively prevent complex operations such as the discontinuance or resumption of the system operation from occurring, and create a snapshot having consistency without having to discontinue the system operation. Consequently, it is possible to realize a computer system and a snapshot creation method thereof capable of a simple and fast system operation.

DESCRIPTION OF DRAWINGS

FIG. 23 is a conceptual diagram explaining a difference buffer;

DETAILED DESCRIPTION

An embodiment of the present invention is now explained in detail with reference to the attached drawings.

(1) First Embodiment

Figure 1:
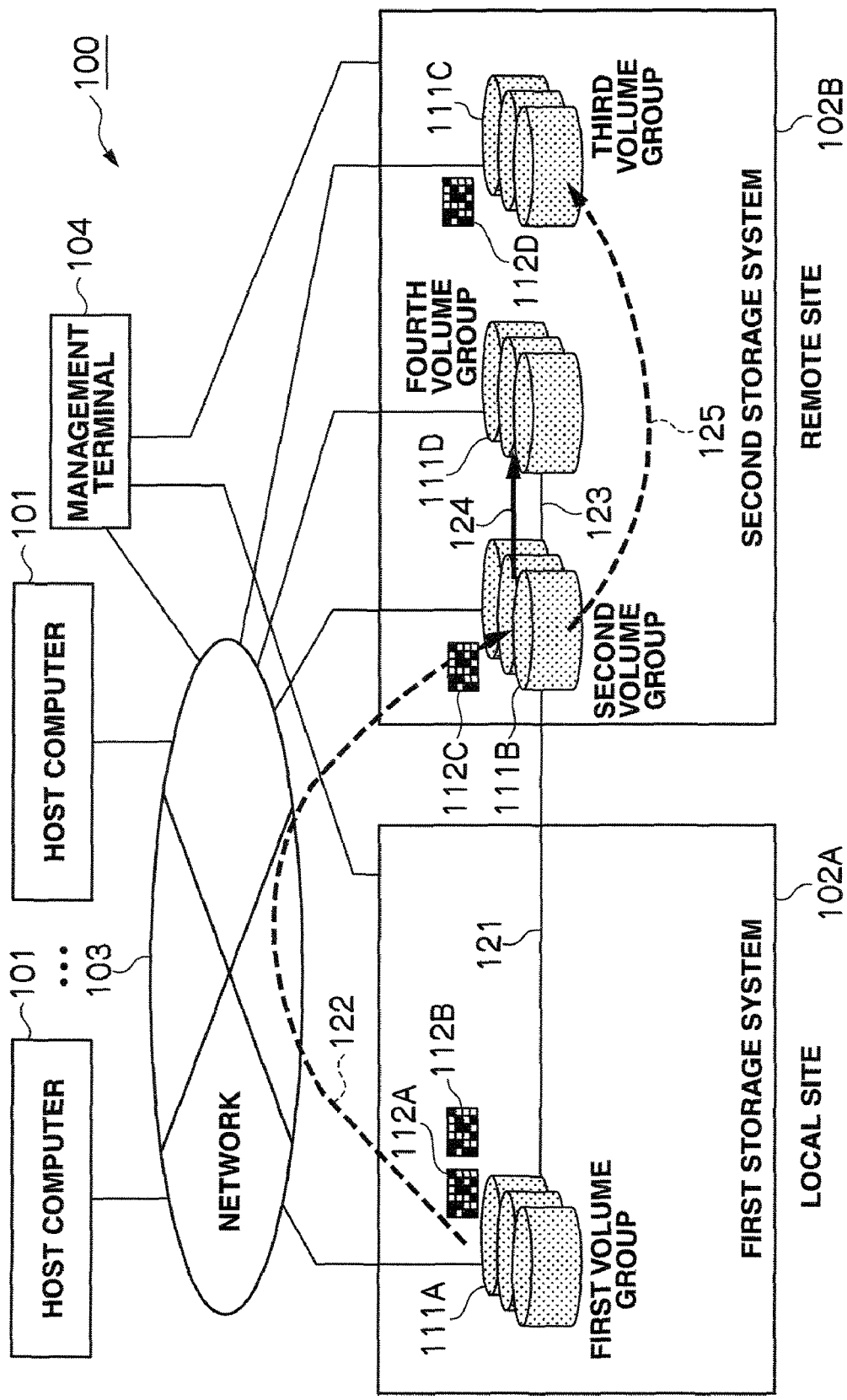
FIG. 1 is a block diagram showing the schematic configuration of a computer system according to an embodiment of the present invention.

FIG. 1 shows a schematic configuration of a computer system 100 according to a first embodiment of the present invention. The computer system 100 is configured by connecting a host computer 101, a first storage system 102A, and a second storage system 102B via a network 103. The computer system 100 is configured by further connecting a management terminal 104 for referring to the internal status to the first storage system 102A and the second storage system 102B via the network 103, or directly.

The first storage system 102A is set on a physical storage extent provided by one or more hard drives 211A, 221B described later, and has one or more first volume groups 111A for storing data. Further, the second storage system 102B has a second volume group 111B, a third volume group 111C and a fourth volume group 111D configured the same as the first volume group 111A.

The first volume group 111A and the second volume group 111B form a pair relationship 121 for executing a volume-to-volume copy of a remote copy. The computer system 100 executes a remote copy 122 between the first volume group 111A and the second volume group 111B. Further, the second volume group 111B and the fourth volume group 111D form a pair relationship 123 for executing a volume-to-volume copy of a local copy, and the computer system 100 executes a local copy 124 between the second volume group 111B and the fourth volume group 111D. Like this, the computer system 100 configures a remote copy system with two pair relationships.

The third volume group 111C is a volume group to become a target of a snapshot 125 of the second volume group 111B. The third volume group 111C, which is a volume group after the snapshot 125 has been executed, is access from the host computer 101 or the like for testing and other applications.

The first storage system 102A has two bitmaps corresponding to the first volume group 111A; namely, an update bitmap 112A and a difference bitmap 112B. The update bitmap 112A represents the portions that are updated by data being written in the first volume group 111A. The difference bitmap 112B represents difference data to be transferred to the second volume group 111B of the second storage system 102B. Further, the second storage system 102B has an update bitmap 112C corresponding to the second volume group 111B, and an update bitmap 112D corresponding to the third volume group 111C.

Generally, the first storage system 102A is physically installed at the local site, and the second storage system 102B is physically installed at the remote site away from the local site to avoid being influenced by a disaster or the like.

Figure 2:
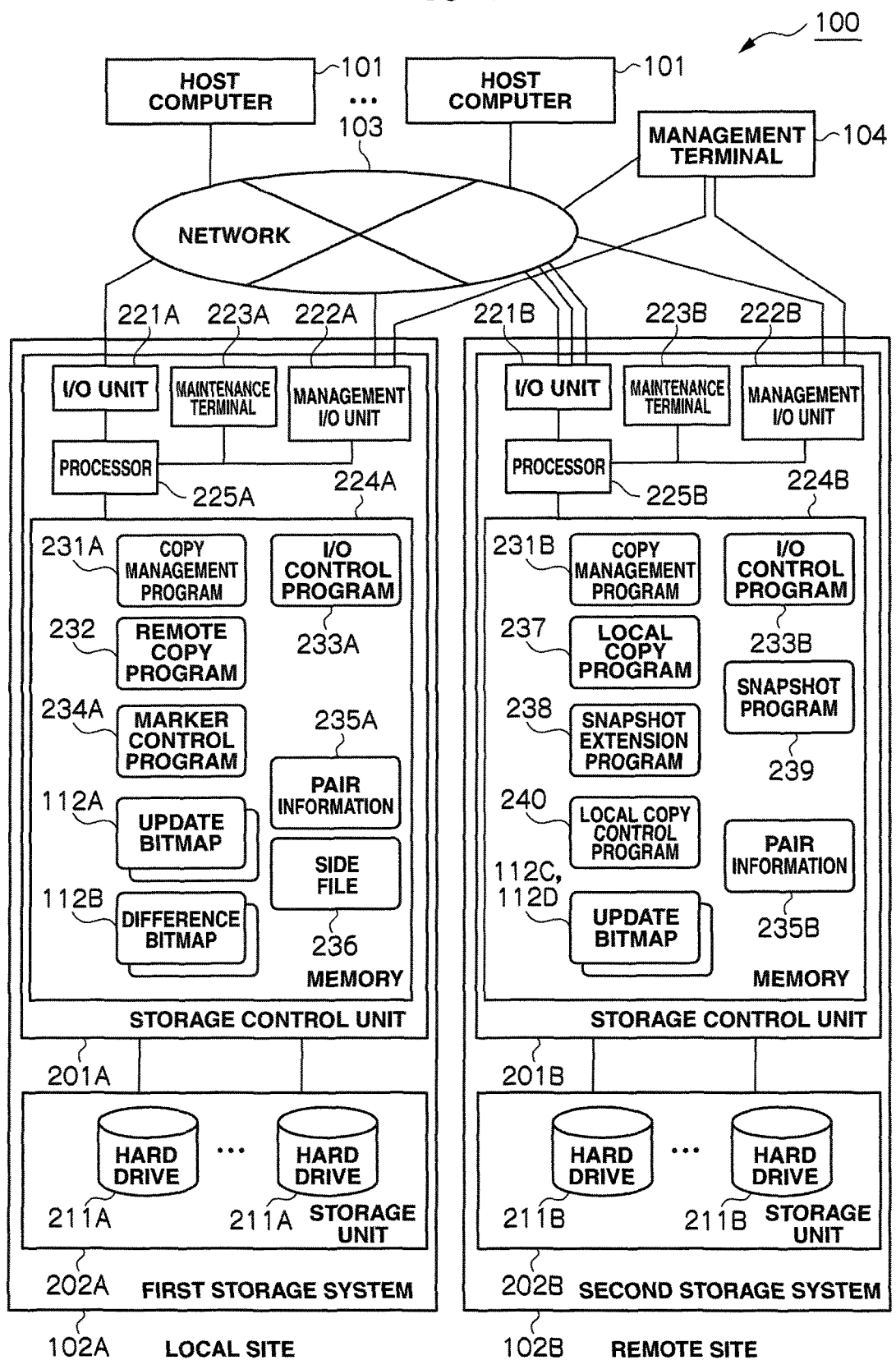
FIG. 2 is a block diagram showing the schematic configuration inside the computer system.

FIG. 2 shows a schematic configuration inside the computer system 100. The first storage system 102A is configured from a storage control unit 201A, and a storage unit 202A connected to the storage control unit 201A. The storage unit 202A is configured from a plurality of hard drives 211A. The storage control unit 201A is configured from an I/O unit 221A connected to the network 103, a management I/O unit 222A connected to the management terminal 104 and the network 103, a maintenance terminal 223A to be used by a user or the like for giving commands to the storage control unit 201A, a memory 224A storing various programs and data, and a processor 225A for primarily operating the various programs stored in the memory 224A. Incidentally, the foregoing hard drive 211A is not limited to a magnetic storage medium such as a hard disk, and may also be a semiconductor memory or the like. Further, the storage control unit can also be configured with the memory 224A as the storage medium. In such a case, the storage unit 202A can configured the storage system without being connected. Moreover, another storage system can be connected via a fibre channel or the like as a substitute for the storage unit 202A so as to operate as a storage unit.

The second storage system 102B is configured the same as the first storage system 102A excluding the point that the various programs and information stored in the memory 224B are different, and the respective constituent elements of the second storage system 102B that correspond to the constituent elements of the first storage system 102A are given a subscript of "B" in substitute for the subscript of "A" next to the same reference numerals. Incidentally, with the computer system 100, from the perspective that the second storage system 102B is a backup storage system, the hard drive 211A of the first storage system 102A can be configured from an expensive hard disk drive such as a SCSI (Small Computer System Interface) disk, and the hard drive 211B of the second storage system 102B can be configured from an inexpensive hard disk drive such as a SATA (Serial AT Attachment) disk or an optical disk.

The memory 224A of the first storage system 102A stores a copy management program 231A for controlling the execution of the remote copy in coordination with a copy management program 231B described later, a remote copy program 232 for controlling the intermittent transfer of difference data from the first volume group 111A of the first storage system 102A to the second volume group 111B of the second storage system 102B, an I/O (Input/Output) control program 233A for controlling the data access (reading and writing) from and to the first volume group 111A, a marker control program 234 for controlling the writing of a marker described later, a plurality of update bitmaps 112A, a plurality of difference bitmaps 112B, pair information 235A, and a side file 236 to be used for retaining write-target data.

Further, the memory 224B of the second storage system 102B stores a copy management program 231B for controlling the execution of the remote copy and local copy in coordination with the copy management program 231A, a local copy program 237, an I/O control program 233B for controlling the data access from and to the second to fourth volume groups 111B to 112D, a snapshot extension program 238, a snapshot program 239, a local copy control data 240, a plurality of update bitmaps 112C, 112D, and pair information 235B.

FIG. 3 to FIG. 6 show the data structure of data retained inside the first and second storage systems 102A, 102B.

Figures 3, 4:
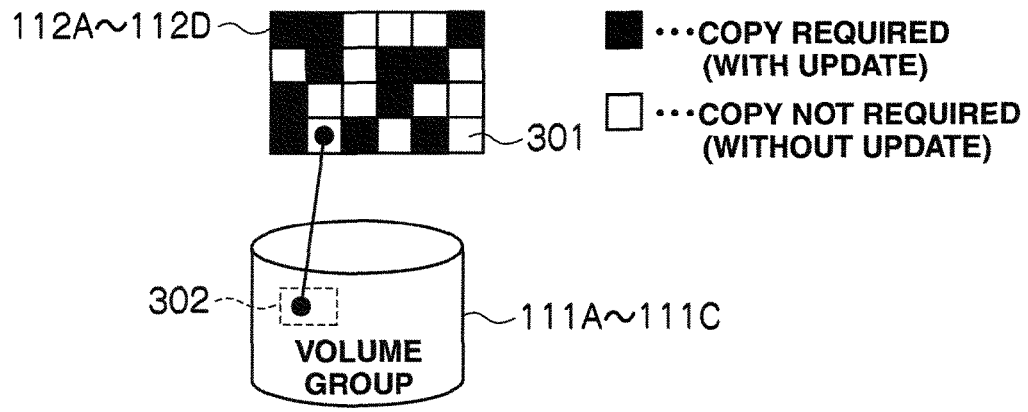
FIG. 3 is a conceptual diagram explaining an update bitmap and a difference bitmap.
FIG. 4 is a conceptual diagram explaining pair information.

FIG. 3 is a schematic explanation of the update bitmaps 112A, 112C, 112D and the difference bitmap 112B. The update bitmaps 112A, 112C, 112D and the difference bitmap 112B exist in correspondence to the first to third volume groups 111A to 111C, and are an aggregate of bits 301 corresponding one-on-one with a storage extent 302 of a fixed size with respect to all storage extents of the first to third volume groups 111A to 111C. The respective bits 301 possess information regarding whether or not the data stored in the storage extent 302 corresponding to the first to third volume groups 111A to 112C has been updated from a certain period in time. The update bitmaps 112A, 111C, 111D are used for recording the storage extent 303 to which data has been written in the corresponding first to third volume groups 111A to 112C within a specified time, or for determining the necessity of performing data copy to the storage extent 302. The difference bitmap 112B is used for referring to data to be copied upon performing the remote copy from the storage extent 303 of the first volume group 111A. Details will be explained in the operation of the programs described later.

FIG. 4 shows a table structure of the pair information 235A. The pair information 235A has the items of a pair identifier 311A, a source volume name 312A as a volume of the copy source, a target volume name 313A as a volume of the copy destination, and a pair relationship 314A representing the pair relationship of the remote copy, and is configured as a list. Incidentally, the pair information 235B is configured the same as the pair information 235A other than the point that the pair relationship of the remote copy, local copy, and snapshot regarding the pair relationship 314B is different.

Figure 5:
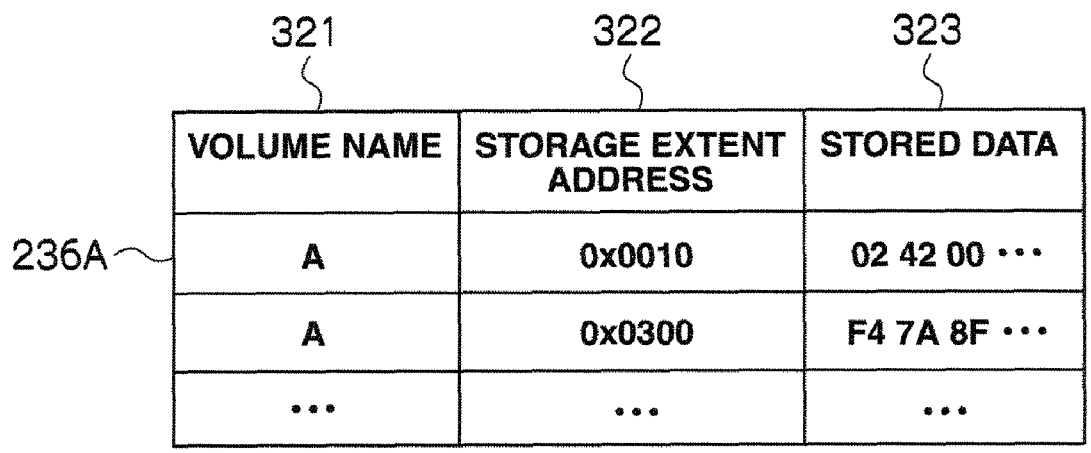
FIG. 5 is a conceptual diagram explaining a side file.

FIG. 5 shows a table structure of the side file 236. The side file 236 has the items of a volume name 321, a storage extent address 322, and a stored data 323, and is configured from a list. The side file 236 is primarily used for temporarily storing data for the purpose of storing data before it is written in the target storage extent. For instance, when transferring data to the second storage system 102B while referring to the difference bitmap 112B and in parallel writing data from the host computer 101 to the second volume 111B, since the storage extent corresponding to the difference bitmap 112B may be changed, the side file 236 can be used to temporarily store data that is currently written in such storage extent, and used as a reference upon transferring data if needed. Further, in addition to being stored in the memory 224A, the side file 236 may also exist in the storage extent of the storage unit 202A. Details will be explained in the operation of the programs described later.

Figure 6:
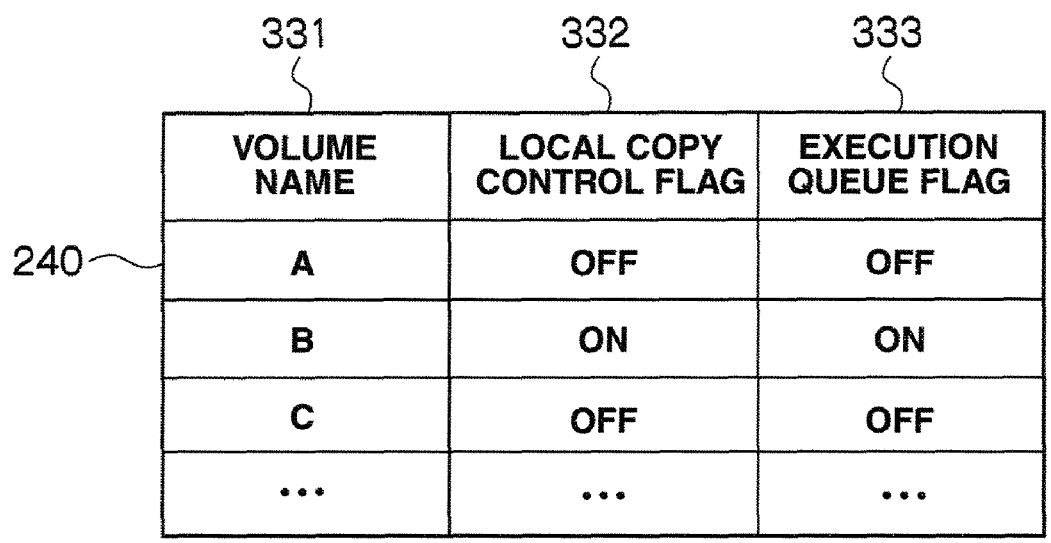
FIG. 6 is a conceptual diagram explaining local copy control data.

FIG. 6 shows a table structure of the local copy control data 240. The local copy control data 240 has the items of a volume name 331, a local copy control flag 332, and an execution queue flag 333, and is configured from a list. The local copy control flag 332 is used for determining whether it is possible to create a snapshot in the relevant volume. Here, if the local copy control flag 332 has been turned on (ON), this means that a local copy can be executed since the remote copy is complete. Meanwhile, if the local copy control flag 332 has been turned off (OFF), this means that a local copy cannot be executed since the remote copy is in execution. The execution queue flag 333 is used for preventing a local copy end report from being sent to the first storage system 102A since the snapshot is in execution. Further, in the foregoing case, if the execution queue flag 333 has been turned on (ON), this means that a remote copy cannot be executed (a local copy end report cannot be sent) since the snapshot is in execution. Meanwhile, if the execution queue flag 333 has been turned off (OFF), this means that a remote copy can be executed (a local copy end report can be sent) since the snapshot is complete.

Figure 7:
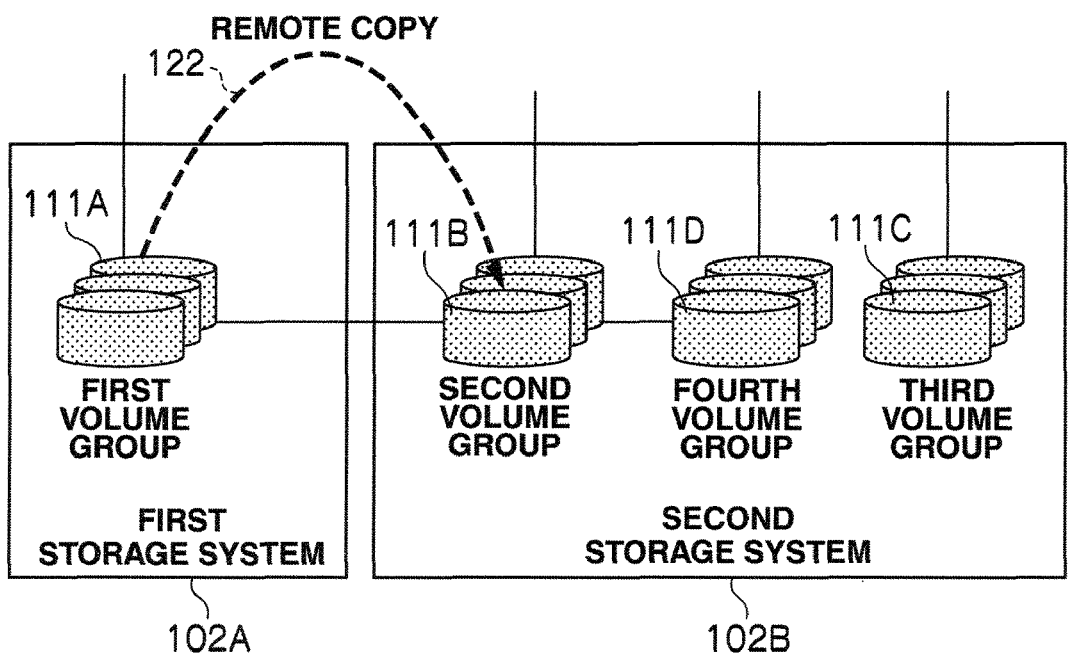
FIG. 7 is a conceptual diagram explaining the operation of a remote copy system.
Figure 8:
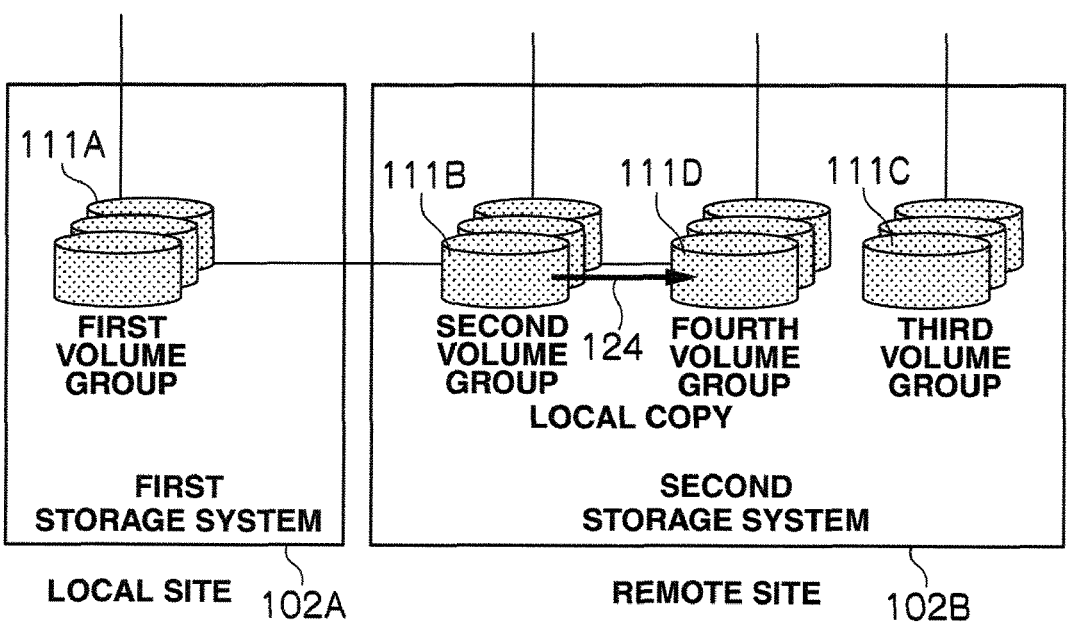
FIG. 8 is a conceptual diagram explaining the operation of a remote copy system.

FIG. 7 and FIG. 8 show the outline of the operation of the remote copy system. The first storage system 102A, as shown in FIG. 7, executes the remote copy 122 for compiling the write-target data which has been written in the first volume group 111A within a specified time, and transferring such compiled data from the first volume group 111A to the second volume group 111B. Subsequently, the second storage system 102B, as shown in FIG. 8, executes the local copy 124 for transferring the compiled data from the second volume group 111B to the fourth volume group 111D. With this computer system 100, it is possible to configure a remote copy system capable of guaranteeing the existence of a volume having data consistency in the second storage system by alternately executing the foregoing remote copy 122 and local copy 124 in cycles. Data consistency will be described in detail later.

Figure 9:
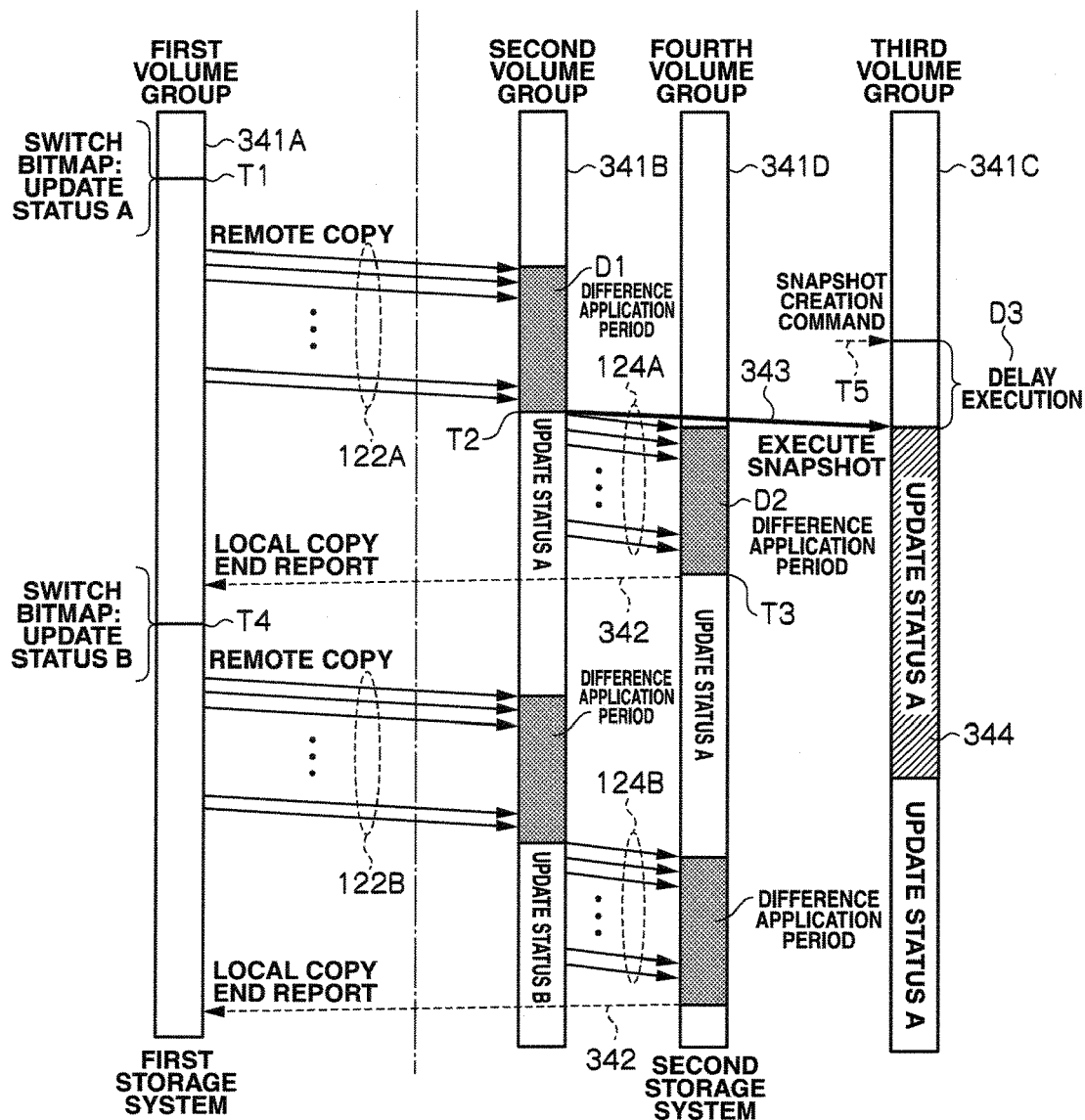
FIG. 9 is a conceptual diagram explaining the update status of the first to fourth volume groups.

FIG. 9 shows the update status of the first to fourth volume groups 111A to 111D in a time series. Here, reference number 341A represents the update status of the first volume group 111A in a time series, reference number 341B represents the update status of the second volume group 111B in a time series, reference number 341C represents the update status of the third volume group 111C in a time series, and reference number 341D represents the update status of the fourth volume group 111D in a time series.

The first storage system 102A, at timing T1, switches the contents of the update bitmap 112A and the difference bitmap 112B corresponding to the first volume group 111A. The update status of the first volume group 111A at this point in time in the first storage system 102A is referred to as an update status A.

Subsequently, the remote copy program 232 of the first storage system 102A executes the remote copy 122A for referring to the contents of the difference bitmap 112B and transferring difference data to the second storage system 102B in order to make the second volume group 111B become an update status A. During a difference application period D1, which is the application period of applying difference data to the second volume group 111B of the second storage system 102B, since data is written in the second volume group 111B independent from the writing sequence from the host computer 101, the data consistency regarding the writing sequence of the second volume group 111B is not guaranteed.

Eventually, the second volume group 111B becomes an update status A when the remote copy 122A is complete and the difference application period D1, which is the application period of difference data for making the update status become an update status A, is complete (timing T2). Thereby, the data consistency of the first volume group 111A and the second volume group 111B will be guaranteed.

Subsequently, the local copy program 221 of the second storage system 102B executes the local copy 124A of transferring difference data from the second volume group 111B to the fourth volume group 111D in order to make the update status of the fourth volume group 111D become an update status A. During a difference application period D2, which is the application period of applying difference data to the fourth volume group 111D, the data consistency regarding the write-target data which has been written in the fourth volume group 111D may not be guaranteed.

Eventually, the fourth volume group 111D becomes an update status A when the local copy 124A is complete and the difference application period D2, which is the application period of difference data, is complete (timing T3). Thereby, the data consistency of the second volume group 111B and the fourth volume group 111D will be guaranteed.

As described above, with the computer system 100, data consistency of the fourth volume group 111D is guaranteed when the second volume group 111B is in the difference application period D1, and data consistency of the second volume group 111B is guaranteed when the fourth volume 112D is in the difference application period D2. Thereby, it is possible to constantly guarantee the existence of a volume having data consistency in the second storage system 102B during the operation of the remote copy system.

Further, with the computer system 100, a local copy end report is sent to the first storage system 102A when the local copy 124A is complete (342), and the remote copy program 232 of the first storage system 102A will thereby complete a single loop. Thereafter, the first storage system 102A, at timing T4, once again switches the contents of the update bitmap 112A and the difference bitmap 112B corresponding to the first volume group 111A. Then, after making the update status of the first volume group 111A of the first storage system at such point in time become an update status B, the first storage system 102A and the second storage system 102B, as with the case described above, intermittently executes the remote copy 122B and the local copy 124B in order to make the update status of the second volume group 111B and the fourth volume group 111D become an update status B.

Here, when a snapshot creation command is issued from the second volume group 111B to the third volume group 111C at timing T5 (difference application period D1 of the second volume group 111B) during the operation of such remote copy system, the second storage system 102B delays the snapshot execution until the difference application period D1 of the second volume group 111B is complete (delay period D3). Then, the second storage system 102B executes a snapshot when the difference application period D1 of the second volume group 111B is complete (343). Here, the second storage system 102B instantaneously ends the execution of the snapshot itself, and executes a background copy of copying all data of the second volume group 111B to the third volume group 111C within a time limit (344).

Further, when data is written in the second volume group 111B during the background copy, the second storage system 102B executes the I/O control program 216B so as to copy data of the relevant storage extent in the second volume group 111B to the corresponding storage extent of the third volume group 111C, and thereafter executes the writing of data in such storage extent of the second volume group 111B. Operation of the I/O control program 216B will be explained later with reference to a flowchart.

Figure 10:
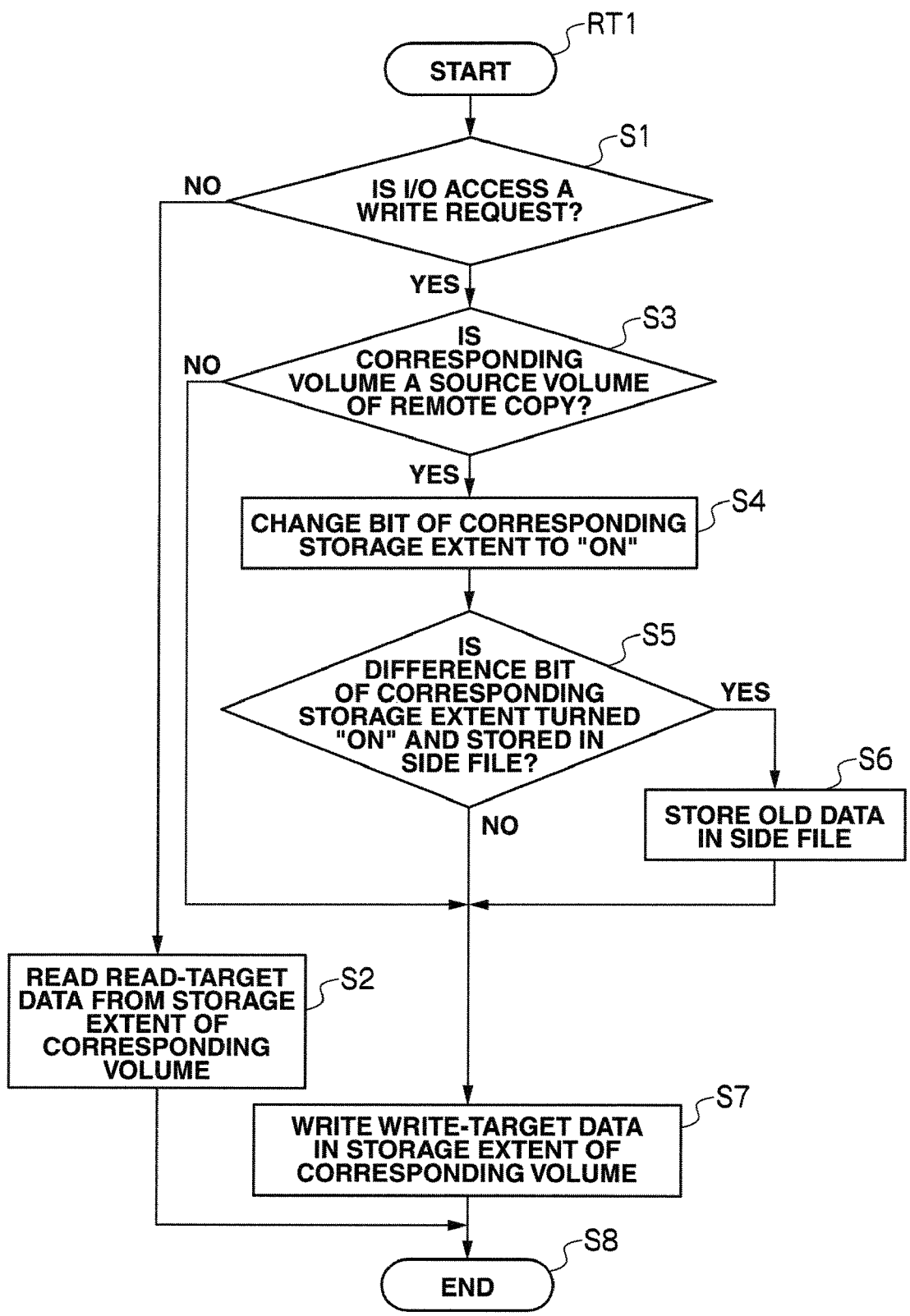
FIG. 10 is a flowchart showing an I/O access processing routine.

An example of I/O access processing (at the local site) in the first storage system 102A is now explained. FIG. 10 is a flowchart showing a specific processing routine of the processor 225A regarding the I/O access processing in the first storage system 102A.

When the processor 225A receives an I/O access (write request or read request) from the host computer 101, it checks whether the type of such I/O access is a write request according to a first I/O access processing routine RT1 shown in FIG. 10 by executing the I/O control program 233A, which is a program for executing the I/O access (S1).

When the type of I/O access is not a write request (S1: NO), the processor 225A determines that the type of I/O access is a read request, and reads read-target data from the storage extent of the volume corresponding to the read request (S2), and thereafter ends the first I/O access processing routine RT1 shown in FIG. 10 (S8).

Contrarily, when the type of I/O access is a write request (S1: YES), the processor 225A checks whether the volume corresponding to the write request is a source volume of the remote copy by referring to the pair information 235A (S3).

When the volume corresponding to the write request is not a source volume of the remote copy (S3: NO), the processor 225A writes the write-target data in a storage extent of a volume corresponding to the write request (S7), and thereafter ends the first I/O access processing routine RT1 shown in FIG. 10 (S8).

Contrarily, when the volume corresponding to the write request is not a source volume of the remote copy (S3: YES), the processor 225A changes the bit 301 of the update bitmap 112A corresponding to the storage extent of a volume corresponding to the write request to "ON" (copy required (with update)) (FIG. 3) (S4).

Subsequently, the processor 225A checks whether the bit 301 of the update bitmap 112A corresponding to the storage extent of a volume corresponding to the write request is "ON", and whether old data stored in the storage extent of a volume corresponding to the write request is not stored in the side file 236 (S5).

In this case, the processor 225A can also determine the existence of storage in the side file 236 and refer to data by recording whether old data has been stored in the side file 236 in the update bitmap 112A or the difference bitmap 112B, and recording the referrals (represented by addresses and the like) to the respective elements of the corresponding side file 236.

When the bit 301 of the difference bitmap 112B corresponding to the storage extent of a volume corresponding to the write request is "OFF" (copy not required (with no update)) (FIG. 3), or the old data that has been stored in the storage extent of a volume corresponding to the write request is stored in the side file 236 (S5: NO), the processor 225A writes the write-target data in the storage extent of a volume corresponding to the write request (S7), and thereafter ends the first I/O access processing routine RT1 shown in FIG. 10 (S8).

Contrarily, when the bit 301 of the difference bitmap 112B corresponding to the storage extent of a volume corresponding to the write request is "ON" (copy required (with update)) (FIG. 3), and the old data that has been stored in the storage extent of a volume corresponding to the write request is not stored in the side file 236 (S5: YES), the processor 225A reads the old data stored in the storage extent of a volume corresponding to the write request and stores this in the side file 236 (S6).

In the foregoing case, the processor 225A specifically stores in the side file 236, together with the read old data, the volume name 321 and the storage extent address 322 representing the position of the storage extent of a volume corresponding to the write request.

Eventually, the processor 225A writes the write-target data in the storage extent of a volume corresponding to the write request (S7), and thereafter ends the first I/O access processing routine RT1 shown in FIG. 10 (S8).

Incidentally, the processor 225A is able to read the read-target data from the storage extent of a volume corresponding to the read request according to a method of making the host computer 101 or a program refer to the data disposed in a cache of the memory 224A, or a method of reading data from a corresponding hard drive of the storage unit 202A and making the host computer 101 or various program refer to such data.

Furthermore, the processor 225A realizes the writing of write-target data by writing the write-target data in a cache of the memory 224A, notifying the end of writing to the host computer 101 and various programs, and writing the write-target data asynchronously in a corresponding hard drive of the storage unit 202A. Further, the processor 225A can also realize the writing of write-target data by synchronously writing the write-target data in a corresponding hard drive of the storage unit 202A.

Figure 11:
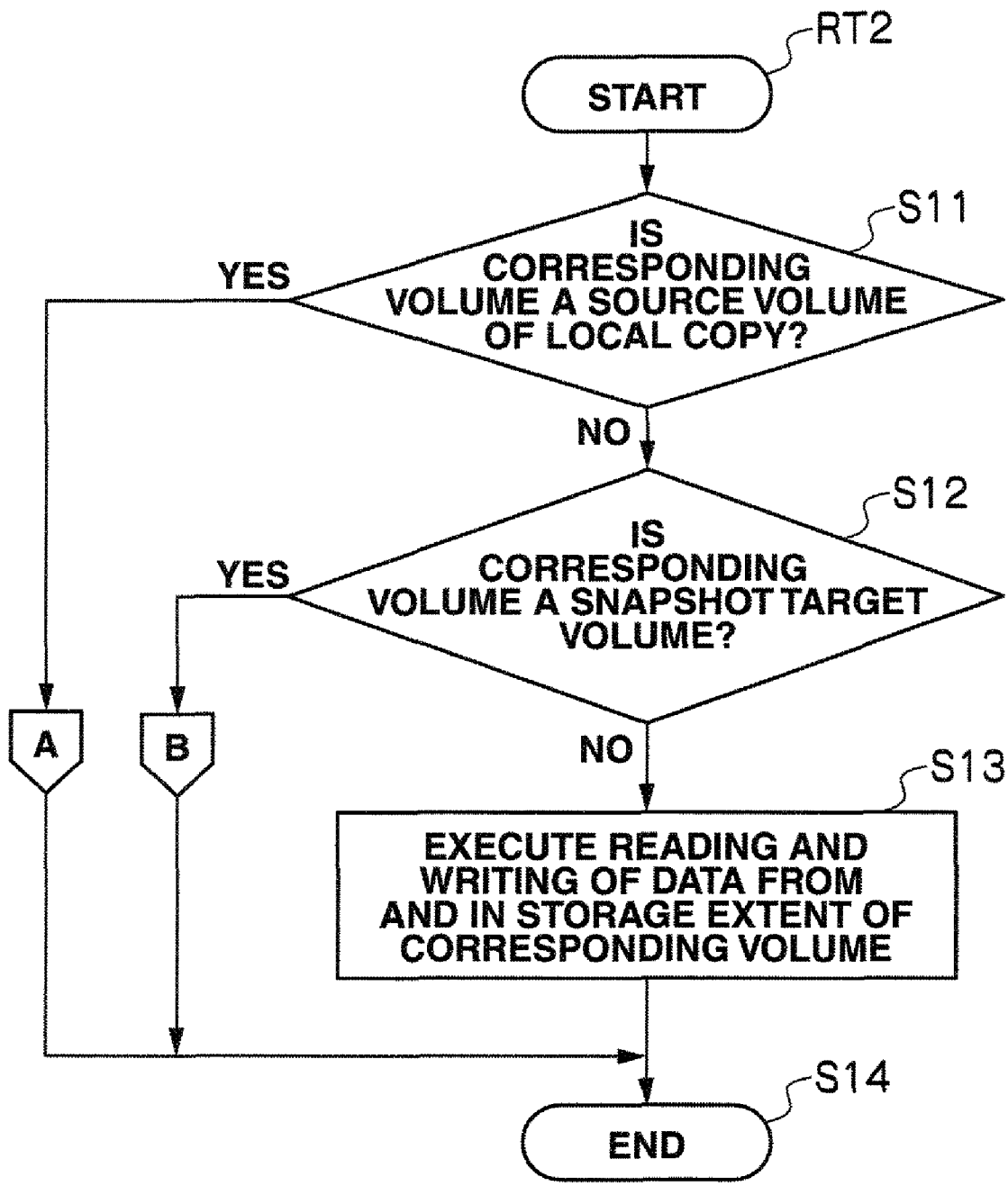
FIG. 11 is a flowchart showing an I/O access processing routine.
Figure 12:
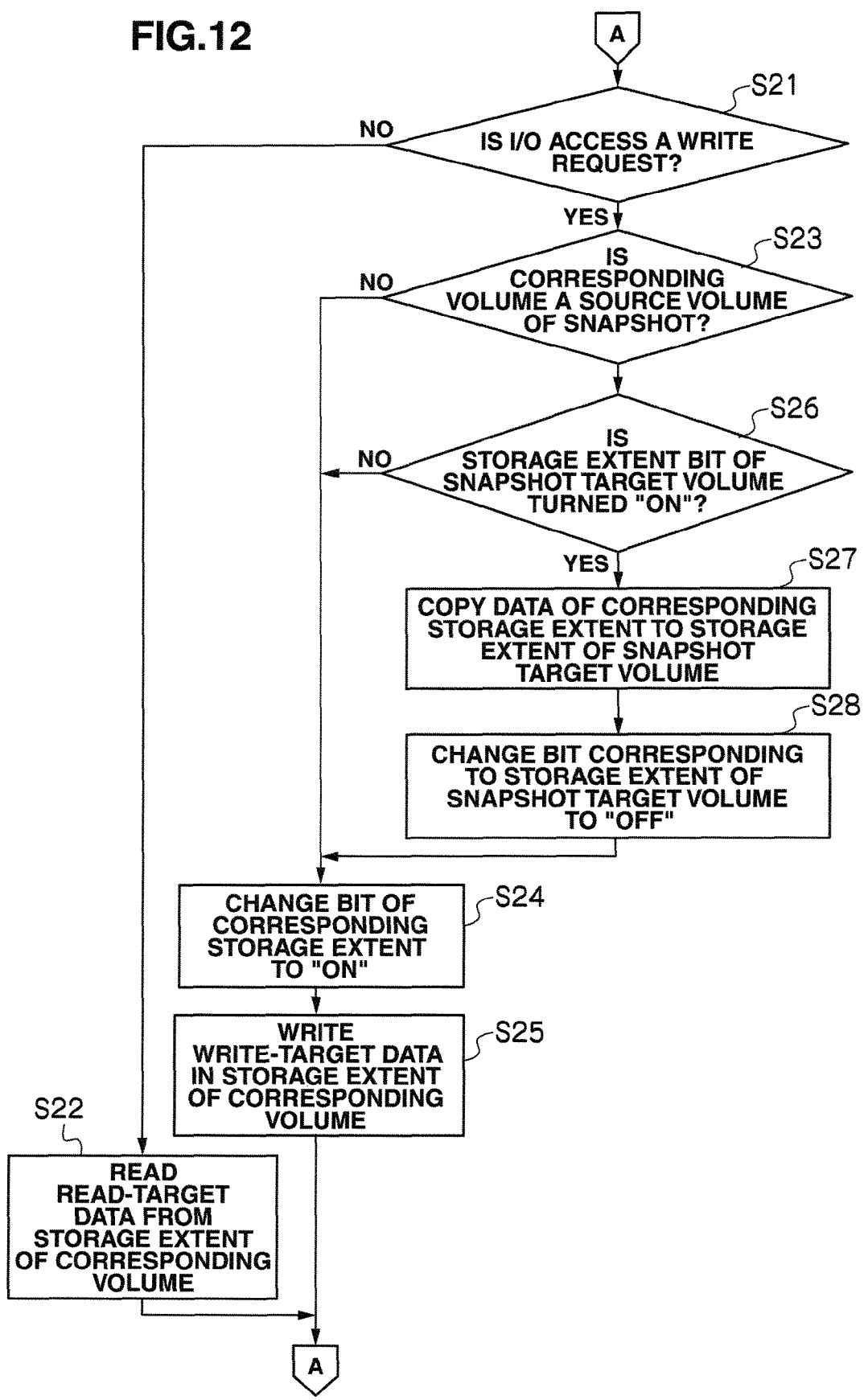
FIG. 12 is a flowchart showing an I/O access processing routine.
Figure 13:
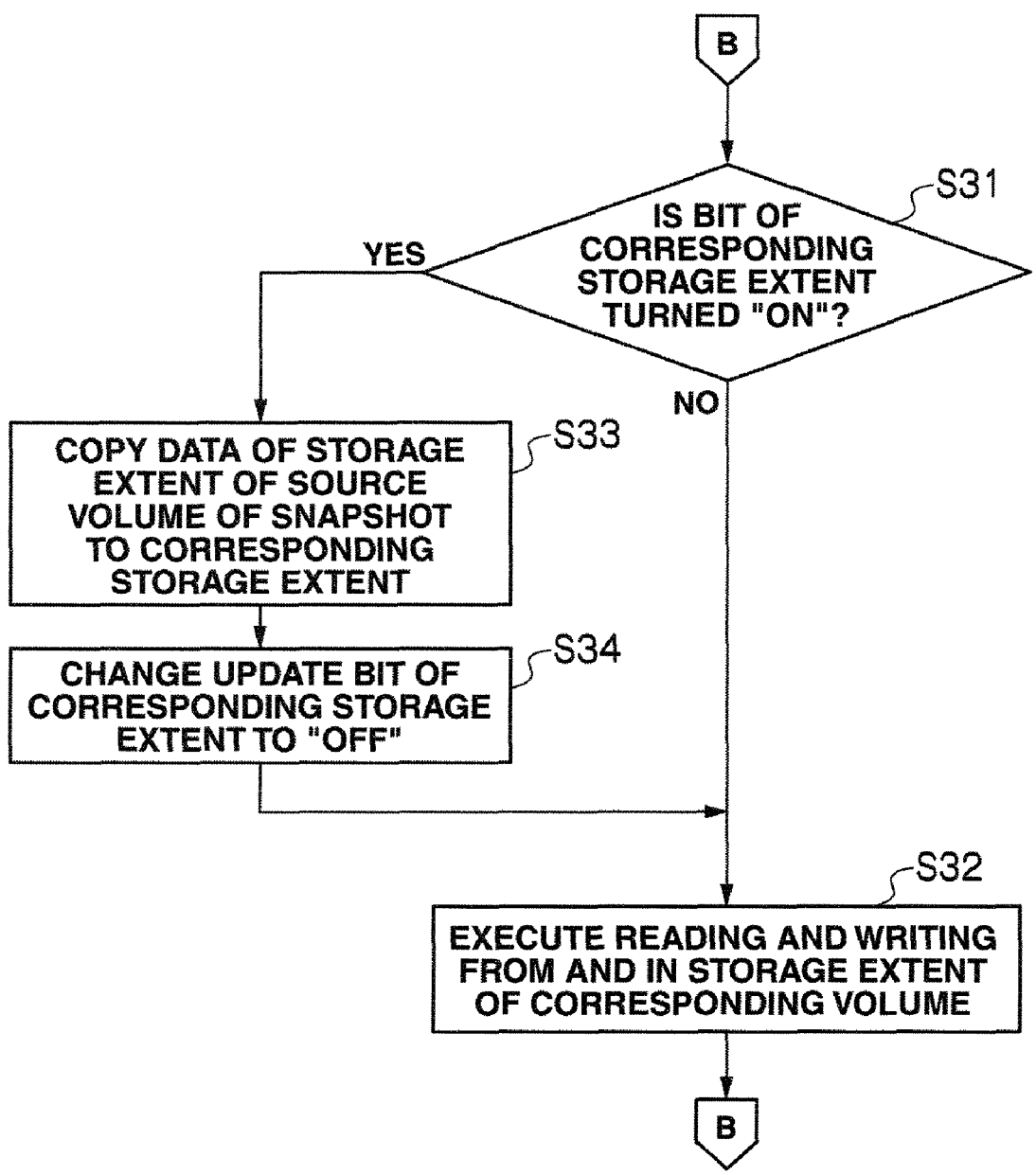
FIG. 13 is a flowchart showing an I/O access processing routine.

An example of I/O access processing (at the remote site) in the second storage system 102B is now explained. FIG. 11 to FIG. 13 are flowcharts showing a specific processing routine of the processor 225B regarding the I/O access processing in the second storage system 102B.

When the processor 225B receives an I/O access from the host computer 101, or receives an I/O access request as a result of the remote copy program 232 of the first storage system 102A being executed, it executes the I/O control program 223B, which is a program for executing the I/O access, for checking whether the volume corresponding to the I/O access is a source volume of a local copy by referring to the pair information 235B according to a second I/O access processing routine RT2 shown in FIG. 11 to FIG. 13 (S11).

When the volume corresponding to the I/O access is not a source volume of a local copy (S11: NO), the processor 225B checks whether the volume corresponding to the I/O access is a snapshot target volume by referring to the pair information 235B (S12).

When the volume corresponding to the I/O access is not a snapshot target volume (S12: NO), the processor 225B executes the reading and writing of data from and in the storage extent of a volume corresponding to the I/O access (S13), and thereafter ends the second I/O access processing routine RT2 shown in FIG. 11 to FIG. 13 (S14).

Contrarily, when the volume corresponding to the I/O access is a source volume of a local copy (S11: YES), the processor 225B checks whether the type of I/O access is a write request (S21) (FIG. 12).

When the type of I/O access is not a write request (S21: NO), the processor 225B determines that the type of I/O access is a read request, reads the read-target data from the storage extent of a volume corresponding to the read request (S22), and thereafter ends the second I/O access processing routine RT2 shown in FIG. 11 to FIG. 13 (S14).

Contrarily, when the type of I/O access is a write request (S21: YES), the processor 225B checks whether the volume corresponding to the write request is a snapshot source volume by referring to the pair information 235B (S23).

When the volume corresponding to the write request is not a snapshot source volume (S23: NO), the processor 225B changes the bit 301 of the update bitmap 112C corresponding to the storage extent of a volume corresponding to the write request to "ON" (S24), writes the write-target data in the storage extent of a volume corresponding to the write request (S25), and thereafter ends the second I/O access processing routine RT2 shown in FIG. 11 to FIG. 13 (S14).

Contrarily, when the volume corresponding to the write request is a snapshot source volume (S23: YES), the processor 225B checks whether the bit 301 of the update bitmap 112D corresponding to the storage extent of such snapshot target volume is "ON" (S26).

When the bit 301 of the update bitmap 112D corresponding to the storage extent of such snapshot target volume is not "ON" (S26: NO), the processor 225B changes the bit 301 of the update bitmap 112C corresponding to the storage extent of a volume corresponding to the write request to "ON" (S24), writes the write-target data in the storage extent of a volume corresponding to the write request (S25), and thereafter ends the second I/O access processing routine RT2 shown in FIG. 11 to FIG. 13 (S14).

Contrarily, when the bit 301 of the update bitmap 112D corresponding to the storage extent of such snapshot target volume is "ON" (S26: YES), the processor 225B copies the data currently stored in the storage extent of a volume corresponding to the write request in the storage extent of the snapshot target volume (S27).

Subsequently, the processor 225B changes the bit 301 of the update bitmap 112D corresponding to the storage extent of a snapshot target volume to "OFF" (S28). Eventually, the processor 225B changes the bit 301 of the update bitmap 112C corresponding to the storage extent of a volume corresponding to the write request to "ON" (S24), writes the write-target data in the storage extent of a volume corresponding to the write request (S25), and thereafter ends the second I/O access processing routine RT2 shown in FIG. 11 to FIG. 13 (S14).

Contrarily, when the volume corresponding to the I/O access is a snapshot target volume (S13: YES), the processor 225B checks whether the bit 301 of the update bitmap 112D of the storage extent of a volume (snapshot target volume) corresponding to the I/O access is "ON" (S31) (FIG. 13).

When the bit 301 of the update bitmap 112D of the storage extent of a volume corresponding to the I/O access is not "ON" (S26: NO), the processor 225B executes the reading and writing of data from and in the storage extent of a volume corresponding to the I/O access (S32), and thereafter ends the second I/O access processing routine RT2 shown in FIG. 11 to FIG. 13 (S14).

Contrarily, when the bit 301 of the update bitmap 112D of the storage extent of a volume corresponding to the I/O access is "ON" (S26: NO), the processor 225B copies the data currently stored in the storage extent of snapshot source volume corresponding to the storage extent of a volume corresponding to the write request to the storage extent of a volume corresponding to the I/O access (S33).

Subsequently, the processor 225B changes the bit 301 of the update bitmap 112D of the storage extent of a volume corresponding to the I/O access to "OFF" (S34).

Eventually, the processor 225B executes the reading and writing of data from and in the storage extent of a volume corresponding to the I/O access (S32), and thereafter ends the second I/O access processing routine RT2 shown in FIG. 11 to FIG. 13 (S14).

Incidentally, the processor 225A realizes the reading and writing of data from and in the storage extent of a volume to read and write data corresponding to the I/O access with the same method as the I/O control program 233A.

Figure 14:
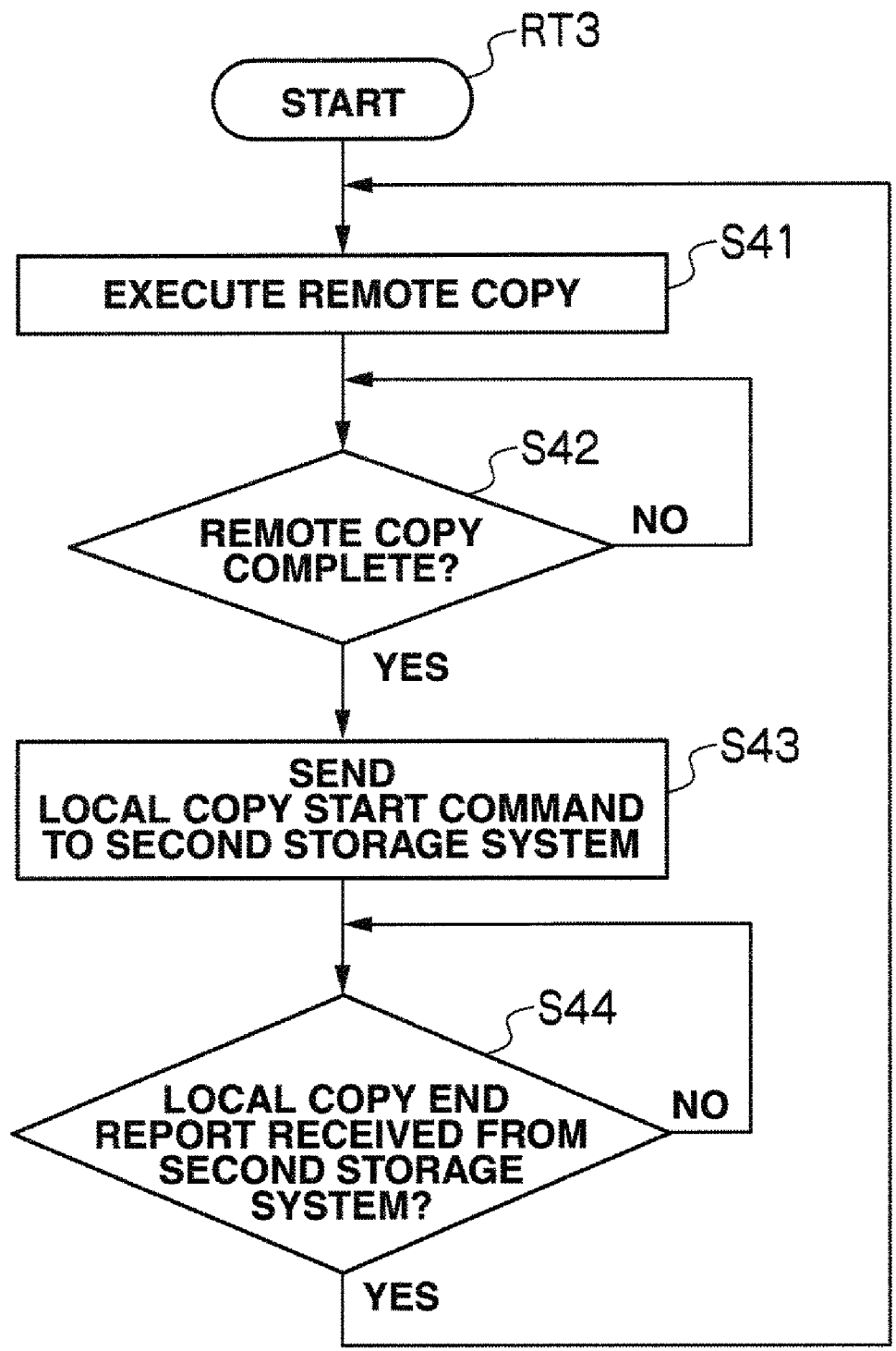
FIG. 14 is a flowchart showing a copy management processing routine.

An example of copy management processing (at the local site) in the first storage system 102A is now explained. FIG. 14 is a flowchart showing a specific processing routine of the processor 225A regarding the copy management processing in the first storage system 102A.

The processor 225A executes the remote copy 122 according to a first copy management processing routine RT3 shown in FIG. 14 by executing in a prescribed timing the copy management program 231A, which is a program for executing the copy management (S41). Subsequently, the processor 225A waits in a standby mode for the remote copy 122 to be completed (S42). When the remote copy 122 is eventually complete (S42: YES), the processor 225A sends a local copy start command to the second storage system 102B (S43).

Subsequently, the processor 225A waits in a standby mode to receive a local copy end report from the second storage system 102B (S44). When the processor 225A eventually receives the local copy end report from the second storage system 102B (S44: YES), it thereafter once again executes the remote copy 122 (S41), returns to a standby mode and waits for the remote copy 122 to be completed (S42), and thereafter repeats the same processing steps (S41 to S44).

Figure 15:
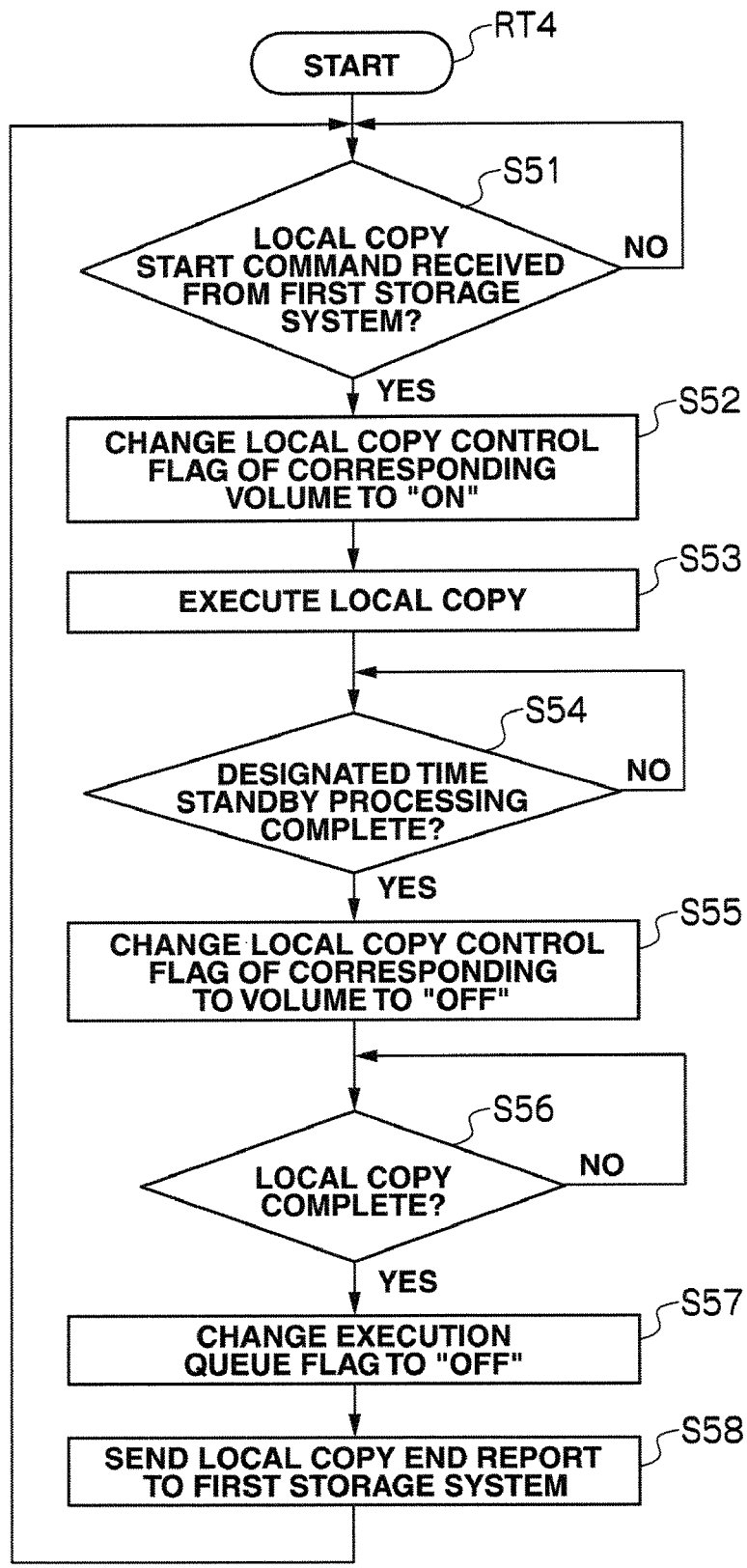
FIG. 15 is a flowchart showing a copy management processing routine.

An example of copy management processing (at the remote site) in the second storage system 102B is now explained. FIG. 15 is a flowchart showing a specific processing routine of the processor 225B regarding the copy management processing in the second storage system 102B.

The processor 225B initially waits in a standby mode to receive a local copy start command from the first storage system 102A according to a second copy management processing routine RT4 shown in FIG. 15 by executing the copy management program 231B, which is a program for executing the copy management (S51). When the processor 225B eventually receives the local copy start command from the first storage system 102A (S51: YES), it changes the local copy control flag 332 of a volume corresponding to the local copy start command in the local copy control data 240 to "ON" (S52).

Subsequently, the processor 225B executes the local copy 124 of a volume corresponding to the local copy start command (S53). Next, the processor 225B waits in a standby mode for the designated time standby processing, which is processing for standing by for a predetermined number of hours, to be completed (S54). Eventually, when the designated time standby processing is complete (S54: YES), the processor 225B changes the local copy control flag 332 of a volume corresponding to the local copy start command in the local copy control data 240 to "OFF" (S55).

Subsequently, the processor 225B waits in a standby mode for the local copy 124 to be completed (S56). Eventually, when the local copy 124 is complete (S56: YES), the processor 225B changes the execution queue flag 333 of a volume corresponding to the local copy start command in the local copy control data 240 to "OFF" (S57).

Subsequently, the processor 225B sends a local copy end report to the first storage system 102A (S58), thereafter returns to a standby mode and waits to receive a local copy start command from the first storage system 102A (S51), and then repeats the same processing steps (S51 to S58).

Incidentally, the processor 225B executes designated time standby processing for controlling the switching interval of the update bitmap 112A and the difference bitmap 112B in the operation of the remote copy system. Here, the longer the switching interval of the update bitmap 112A and the difference bitmap 112B, the amount of write-target data to be overwritten in the update bitmap 111A will increase. Thus, it is possible to reduce the overall data traffic. Meanwhile, the shorter the switching interval between the update bitmap 112A and the difference bitmap 112B, the possibility of recovering data near the failure point will increase. This interval is individually and specifically decided based on a tradeoff in consideration of the demand.

Figure 16:
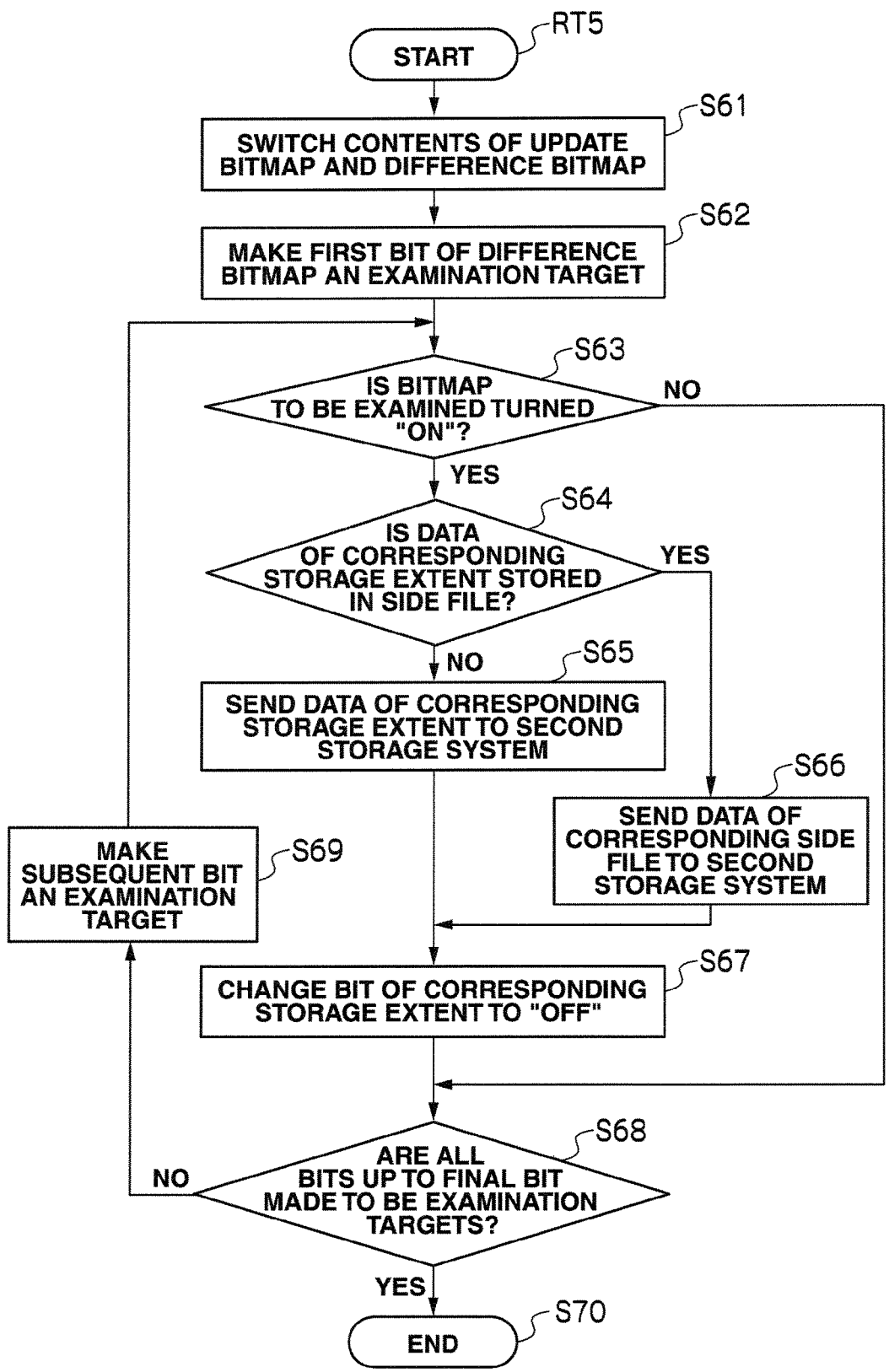
FIG. 16 is a flowchart showing a remote copy processing routine.

An example of remote copy processing in the first storage system 102A is now explained. FIG. 16 is a flowchart showing a specific processing routine of the processor 225A regarding the remote copy processing in the first storage system 102A.

The processor 225A switches the contents of the update bitmap 112A and the difference bitmap 112B according to a remote copy processing routine RT5 shown in FIG. 16 by executing in a prescribed timing the remote copy program 232, which is a program for executing the remote copy 122 with the copy management program 231A (S61).

Subsequently, the processor 225A makes the first bit 301 of the difference bitmap 112B become an examination target (S62). Next, the processor 225A checks whether the bit 301 of the difference bitmap 1128 to be examined is "ON" (S63). When the bit 301 of the difference bitmap 112B to be examined is not "ON" (S63: NO), the processor 225A proceeds to step S68. Contrarily, when the bit 301 of the difference bitmap 1128 to be examined is "ON" (S63: YES), the processor 225A checks whether data of the storage extent corresponding to the bit 301 of the difference bitmap to be examined is stored in the side file 236 (S64).

When data of the storage extent corresponding to the bit 301 of the difference bitmap to be examined is not stored in the side file 236 (S64: NO), the processor 225A sends data of the storage extent corresponding to the bit 301 of the difference bitmap 112B to be examined to the second storage system 102B (S65). Contrarily, when data of the storage extent corresponding to the bit 301 of the difference bitmap to be examined is stored in the side file 236 (S64: YES), the processor 225A sends data stored in the side file 236 corresponding to the bit 301 of the difference bitmap 112B to be examined to the second storage system 1028 (S66).

The processor 225A eventually changes the bit 301 of the difference bitmap 112B to be examined to "OFF" (S67). Subsequently, the processor 225A checks whether all bits up to the last bit 301 of the difference bitmap 112B have been made to be an examination target (S68).

When all bits up to the last bit 301 of the difference bitmap 1128 have not been made to be an examination target (S68: NO), the processor 225A makes the subsequent bit 301 of the difference bitmap 112B an examination target (S69), thereafter once again checks whether the bit 301 of the difference bitmap 1128 to be examined is "ON" (S63), and then repeats the same processing steps (S63 to S68). Contrarily, when all bits up to the last bit 301 of the difference bitmap 112B have been made to be an examination target (S68: YES), the processor 225A thereafter ends the remote copy processing routine RT5 shown in FIG. 16 (S70).

Figure 17:
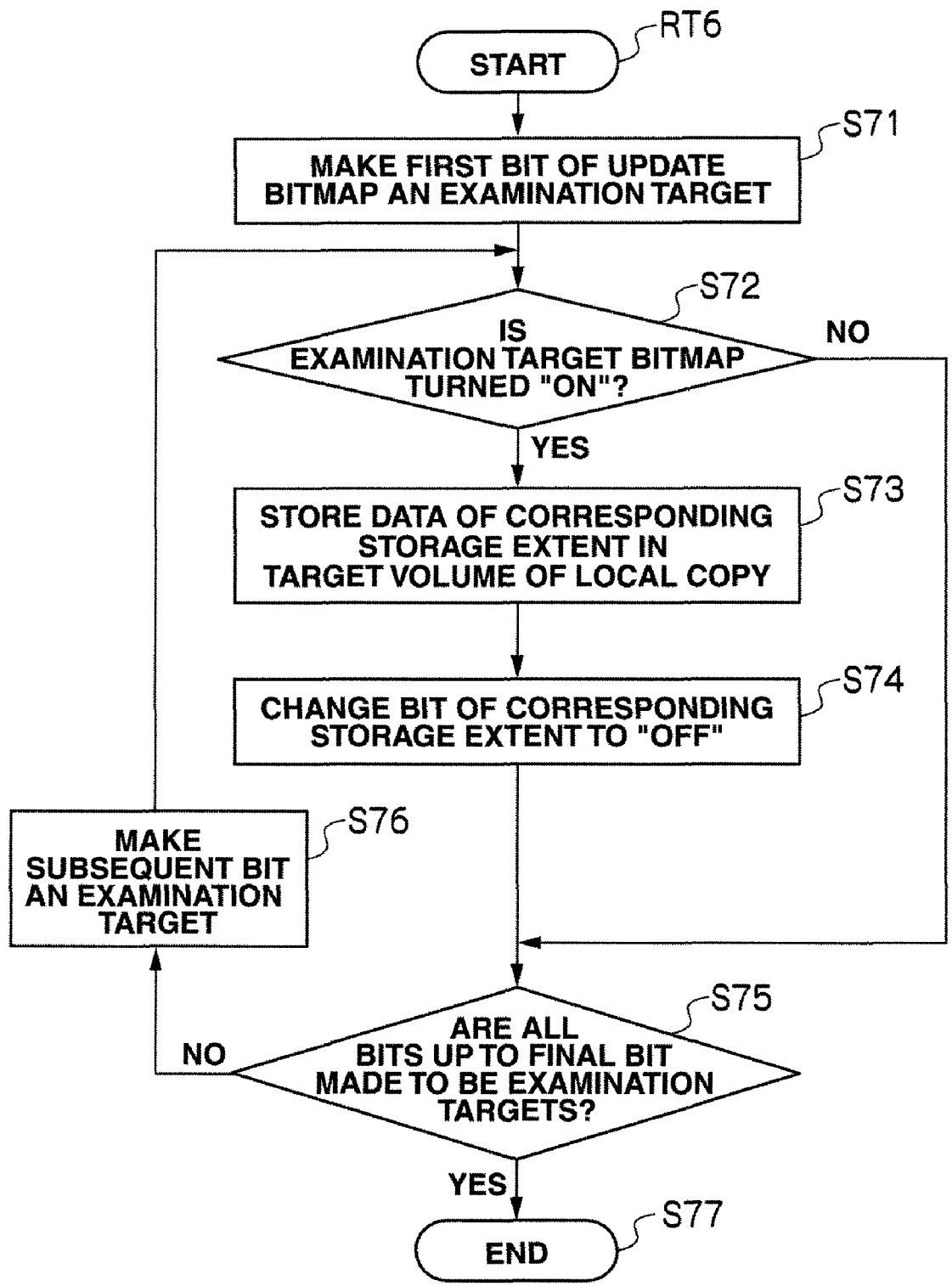
FIG. 17 is a flowchart showing a local copy processing routine.

An example of local copy processing in the second storage system 102B is now explained. FIG. 17 is a flowchart showing a specific processing routine of the processor 225B concerning the local copy processing in the second storage system 102B.

When the processor 225B receives a local copy start command from the first storage system 102A, it makes the first bit 301 of the update bitmap 112C an examination target according to a local copy processing routine RT6 shown in FIG. 17 by executing the local copy program 237, which is a program for executing the local copy 124 with the copy management program 231B (S71). Subsequently, the processor 225B checks whether the bit 301 of the update bitmap 112C to be examined is "ON" (S72).

When the bit 301 of the update bitmap 112C to be examined is not "ON" (S72: NO), the processor 225B proceeds to step S75. Contrarily, when the bit 301 of the update bitmap 112C to be examined is "ON" (S72: YES), the processor 225B stores data of the storage extent corresponding to the bit 301 of the update bitmap 112C to be examined in the storage extent of the target volume of a local copy (S73).

The processor 225B eventually changes the bit 301 of the update bitmap 112C to be examined to "OFF" (S74). Subsequently, the processor 225B checks whether all bits up to the final bit 301 of the update bitmap 112C have been made to be an examination target (S75).

When all bits up to the final bit 301 of the update bitmap 112C have not been made to be an examination target (S75: NO), the processor 225B makes the subsequent bit 301 of the update bitmap 112C an examination target (S76), thereafter once again checks whether the bit 301 of the update bitmap 112C to be examined is "ON" (S72), and then repeats the same processing steps (S72 to S75).

Contrarily, when all bits up to the final bit 301 of the update bitmap 112C have been made to be an examination target (S75: YES), the processor 225B thereafter ends the local copy processing routine RT6 shown in FIG. 17 (S77).

Figure 18:
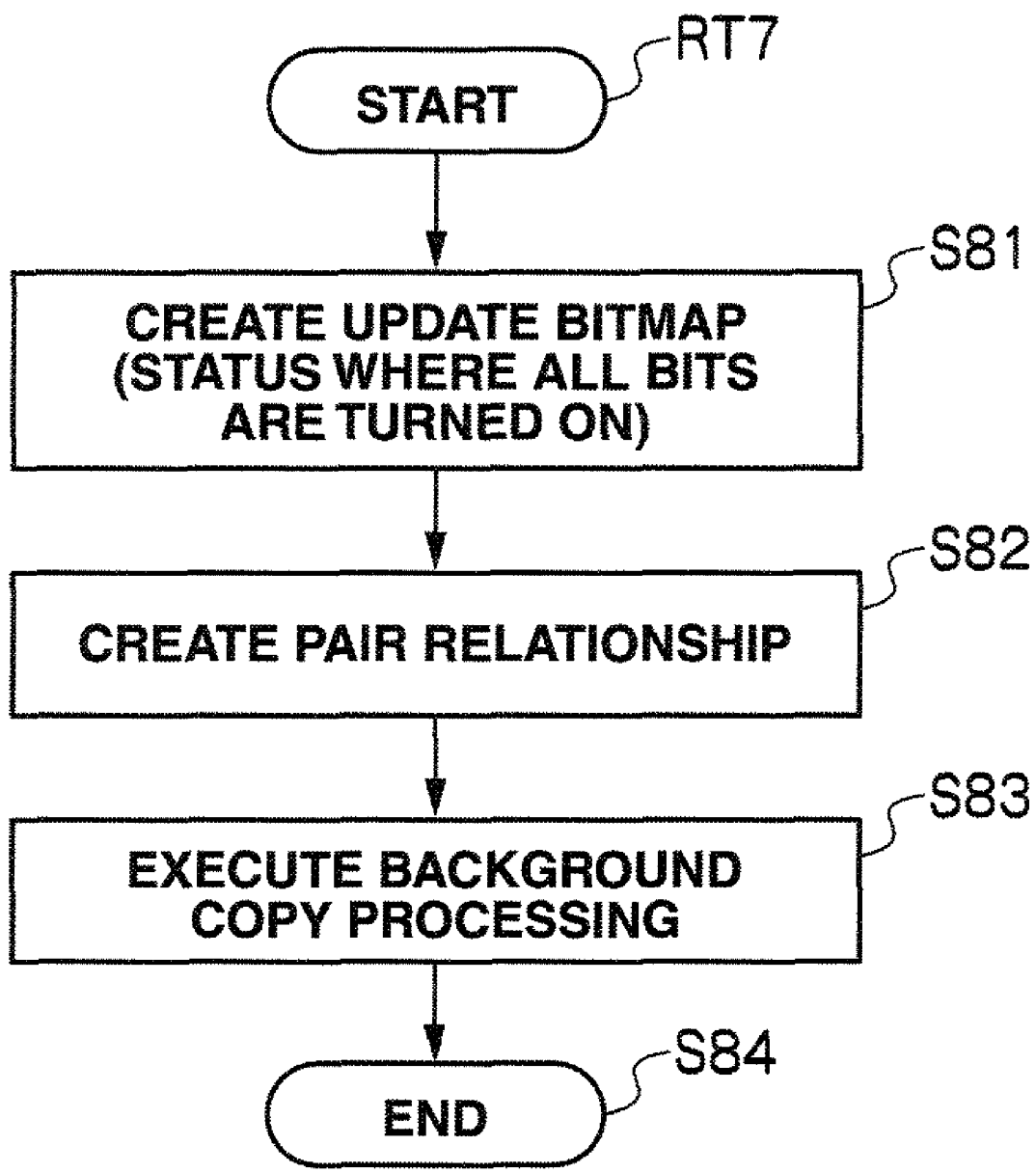
FIG. 18 is a flowchart showing a snapshot processing routine.

An example of snapshot processing in the second storage system 102B is now explained. FIG. 18 is a flowchart showing a specific processing routine of the processor 225B regarding the snapshot processing in the second storage system 102B.

When the processor 225B receives the input of a snapshot source volume and a snapshot target volume based on a command of a user or a program from the host computer 101 or management terminal 104, or other maintenance terminals 223A, 223B or programs, it creates an update bitmap 112D where all bits 301 corresponding to the snapshot target volume are all "ON" (changes the update bitmap 112D to a status where all bits 301 corresponding to the snapshot target volume are "ON") according to a snapshot processing routine RT7 shown in FIG. 18 by executing the snapshot program 239, which is a program for executing the snapshot 125 (S81).

Subsequently, the processor 225B creates a pair relationship by adding information representing the snapshot source volume name and the snapshot target volume name, and information representing the snapshot pair relationship to the list of the pair information 235B (S82). Next, the processor 225B executes background copy processing (S83), and thereafter ends the snapshot processing routine RT7 shown in FIG. 18 (S84).

Figure 19:
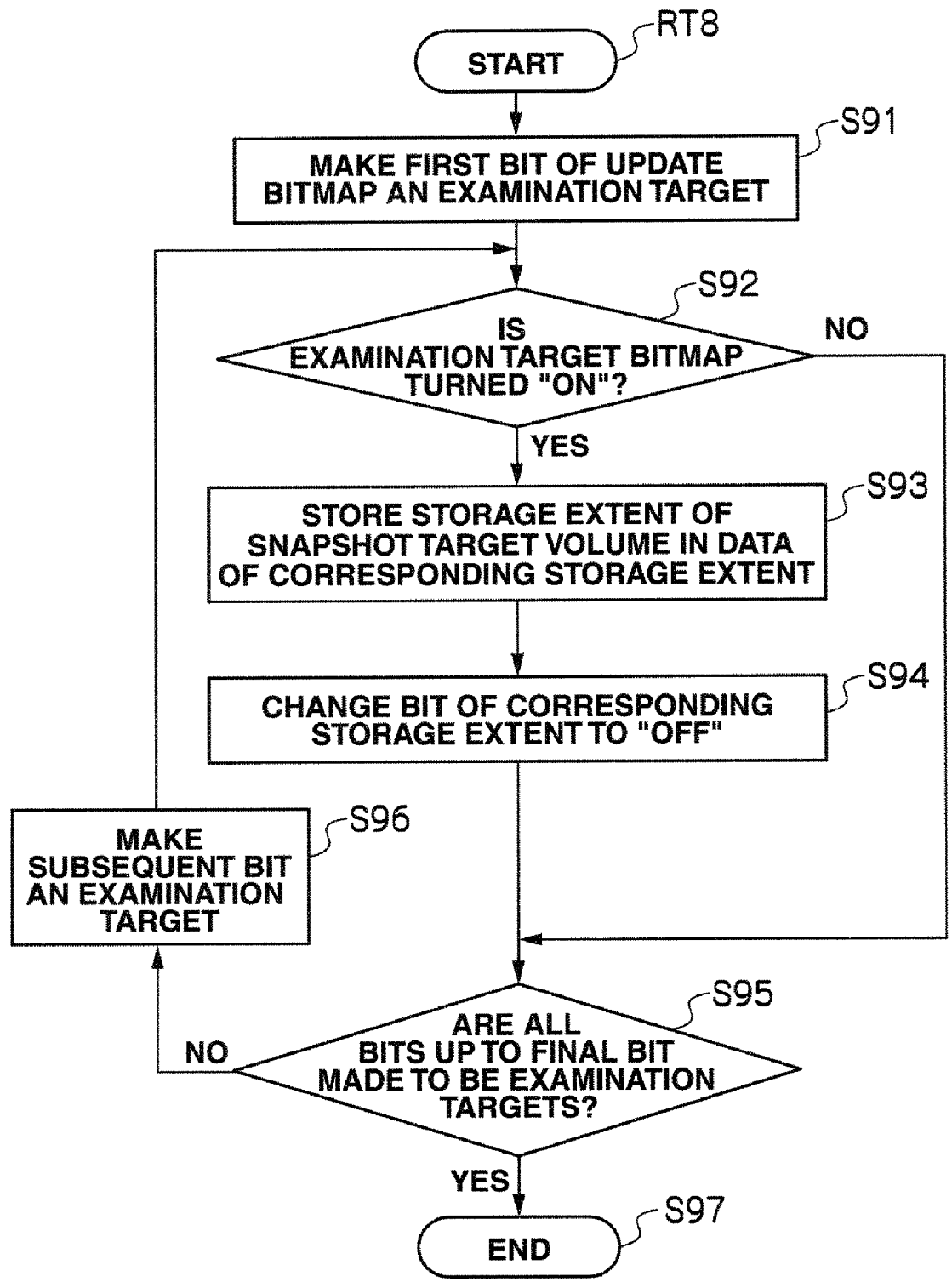
FIG. 19 is a flowchart showing a background copy processing routine.

An example of background copy processing in the second storage system 102B is now explained. FIG. 19 is a flowchart showing a specific processing routine of the processor 225B concerning the background copy processing in the second storage system 102B.

When a pair relationship is created, the processor 225B makes the first bit 301 of the update bitmap 112D an examination according to a background copy processing routine RT8 shown in FIG. 19 (S91). Subsequently, the processor 225B checks whether the bit 301 of the update bitmap 112D to be examined is "ON" (S92). When the bit 301 of the update bitmap 112D to be examined is not "ON" (S92: NO), the processor 225B proceeds to step S95. Contrarily, when the bit 301 of the update bitmap 112D to be examined is "ON" (S92: YES), the processor 225B stores data of the storage extent corresponding to the bit 301 of the update bitmap 112D to be examined in the storage extent of the snapshot target volume (S93).

The processor 225B eventually changes the bit 301 of the update bitmap 112D to be examined to "OFF" (S94). Subsequently, the processor 225B checks whether all bits up to the final bit 301 of the update bitmap 112D have been made to be an examination target (S95).

When all bits up to the final bit 301 of the update bitmap 112D have not been made to be an examination target (S95: NO), the processor 225B makes the subsequent bit 301 of the update bitmap 112D an examination target (S96), thereafter once again checks whether the bit 301 of the update bitmap 112D to be examined is "ON" (S92), and then repeats the same processing steps (S92 to S95).

Contrarily, when all bits up to the final bit 301 of the update bitmap 112D have been made to be an examination target (S95: YES), the processor 225B thereafter ends the background copy processing routine RT8 shown in FIG. 19 (S97). Incidentally, the processor 225B is able to end the background copy processing within a time limit since the update bitmap 112D will not be turned "OFF" by various control programs or the like, and there is a limited in the size of the update bitmap 112D.

Further, there may be cases where the processor 225B does not execute the background copy processing since the snapshot target volume can be I/O accessed from the host computer 101 or the like. Further, when the background copy processing is not to be executed or during the execution of the background copy processing, the processor 225B may be subject to a slight deterioration in performance since an overhead will occur in copying data from the snapshot source volume in the read processing to be performed to the snapshot target volume.

Figure 20:
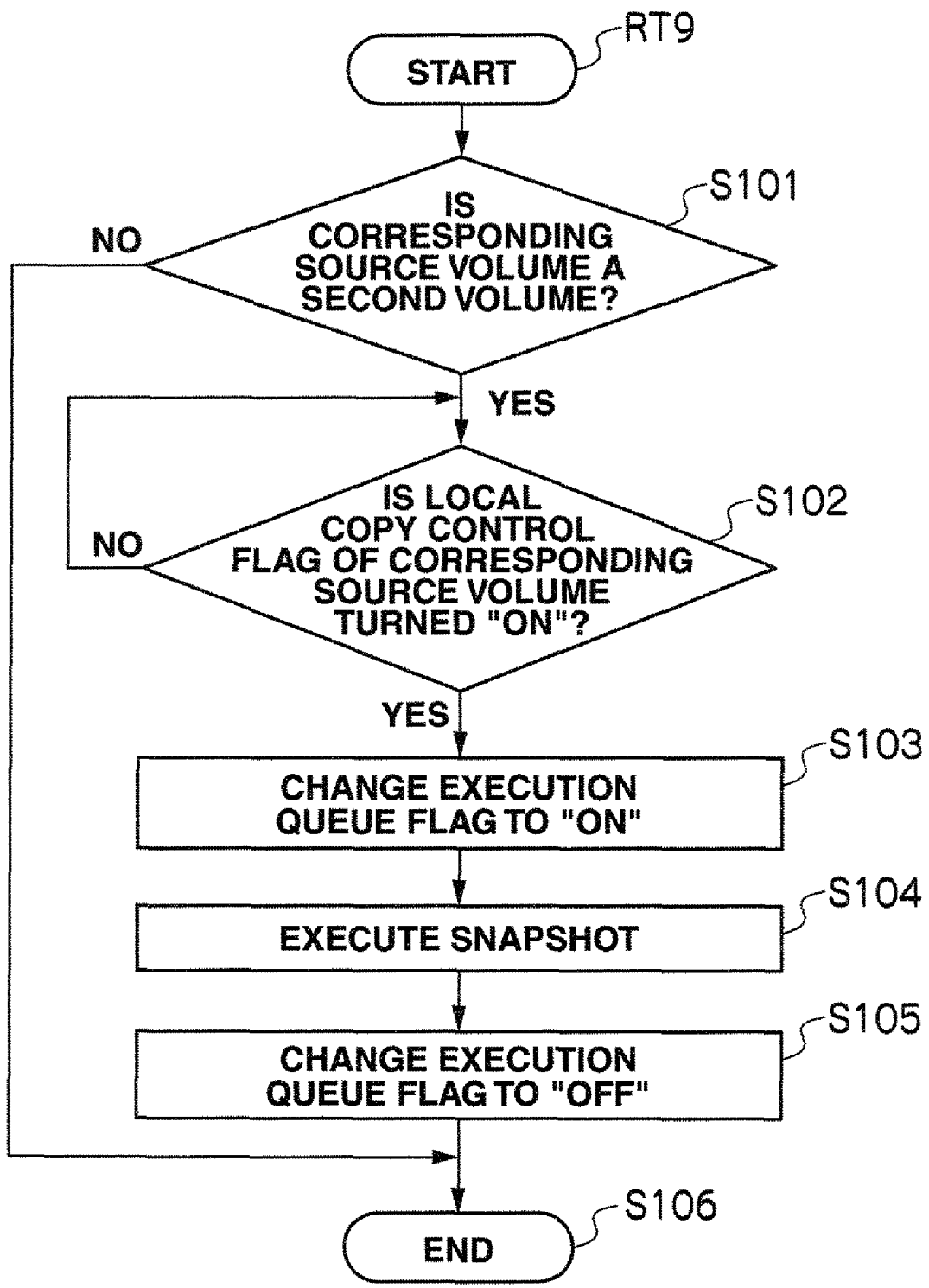
FIG. 20 is a flowchart showing an extended snapshot processing routine.

An example of extended snapshot processing in the second storage system 102B is now explained. FIG. 20 is a flowchart showing a specific processing routine of the processor 225B regarding the extended snapshot processing in the second storage system 102B.

When the processor 225B receives a snapshot creation command based on a command of a user or a program from the host computer 101 or management terminal 104, or other maintenance terminals 223A, 223B or programs, it executes the snapshot extension program 238, which is a program for executing the snapshot 125 based on the snapshot creation command, for checking whether the source volume corresponding to the snapshot creation command is a volume of the second volume group 111B by referring to the pair information 235B according to an extended snapshot processing routine RT9 shown in FIG. 20 (S101).

When the source volume corresponding to the snapshot creation command is not a volume of the second volume group 111B (S101: NO), the processor 225B thereafter ends the extended snapshot processing routine RT9 shown in FIG. 20 (S106). Contrarily, when the source volume corresponding to the snapshot creation command is a volume of the second volume group 111B (S101: YES), the processor 225B checks whether the local copy control flag 332 of a source volume corresponding to the snapshot creation command in the local copy control data 240 is "ON" (S102).

When the local copy control flag 332 of a source volume corresponding to the snapshot creation command in the local copy control data 240 is not "ON" (S102: NO), the processor 225B waits in a standby mode for the local copy control flag 332 of the source volume to be turned "ON". Contrarily, when the local copy control flag 332 of a source volume corresponding to the snapshot creation command in the local copy control data 240 is "ON" (S102: YES), the processor 225B changes the execution queue flag 333 of a source volume corresponding to the snapshot creation command in the local copy control data 240 to "ON" (S103).

Subsequently, the processor 225B executes the snapshot 125 from a source volume corresponding to the snapshot creation command to the corresponding target volume (S104). Next, the processor 225B changes the execution queue flag 333 of a source volume corresponding to the snapshot creation command in the local copy control data 240 to "OFF" (S105). Eventually, the processor 225B thereafter ends the extended snapshot processing routine RT9 shown in FIG. 20 (S106).

Like this, with the computer system 100 in the first embodiment, as a result of utilizing the fact that the data consistency in the second volume group 111B is maintained other than during the async remote copy 122 from the first volume group 111A to the second volume group 111B, creation of the snapshot is delayed until the transfer of the remote copy 122 is complete when a snapshot creation command from the second volume group 111B to the third volume group 111C is issued during such transfer, and a snapshot is created instantaneously when a snapshot creation command is issued when there is no transfer of the remote copy 122.

Accordingly, even when testing or the like is conducted during the operation of the remote copy system, it is possible to effectively prevent complex operations such as the discontinuance or resumption of the system operation from occurring, and create a snapshot having consistency without having to discontinue the system operation.

(2) Second Embodiment

Figure 21:
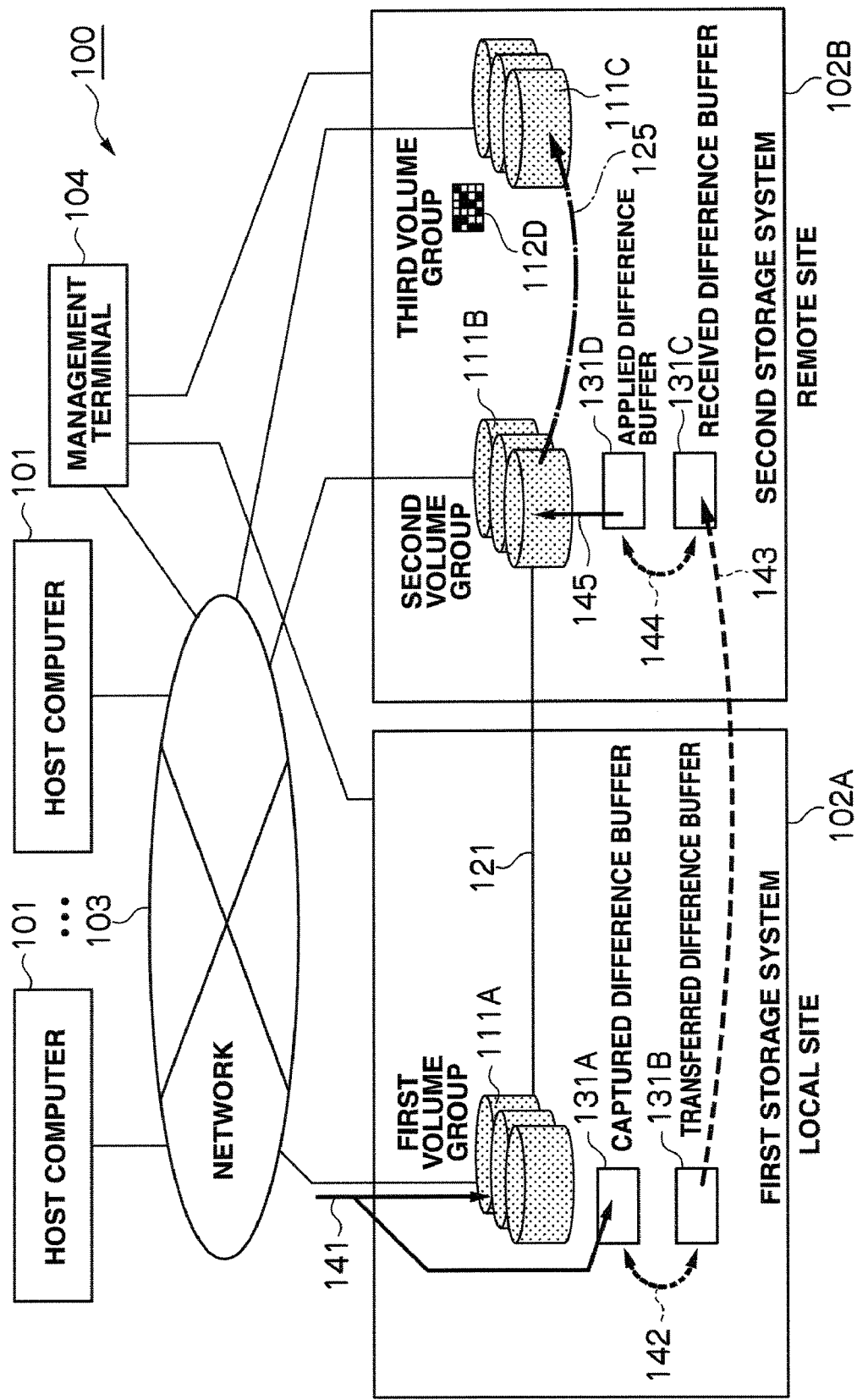
FIG. 21 is a block diagram showing the schematic configuration of a computer system according to a second embodiment of the present invention.

FIG. 21 shows a schematic configuration of the computer system 100 according to a second embodiment of the present invention. The computer system 100 is configured the same as the computer system 100 in the first embodiment other than that a captured difference buffer 131A and a transferred difference buffer 131B are provided to the first storage system 102A in substitute for the update bitmap 112A and the difference bitmap 112B, and a received difference buffer 131C and an applied difference buffer 131D are provided to the second storage system in substitute for the update bitmap 112C and the fourth volume group 111D, and the captured difference buffer 131A, the transferred difference buffer 131B, the received difference buffer 131C and the applied difference buffer 131D are used to operate the remote copy system.

In the first embodiment, for instance, a volume having data consistency is guaranteed by managing two volume groups in the second storage system 102B. In the second embodiment, a volume having data consistency is guaranteed by providing the received difference buffer 131C and the applied difference buffer 131D for accumulating write-target data in the second storage system 102B.

The operation in the second embodiment is now schematically explained. The first storage system 102A simultaneously stores the write-target data from the host computer 101 or the like in the first volume group 111A and in the captured difference buffer 131A (141). Subsequently, the first storage system 102A switches the captured difference buffer 131A and the transferred difference buffer 131B (142). Here, after the foregoing switch, the first storage system 102A once again simultaneously stores the write-target data from the host computer 101 or the like in the first volume group 111A and in the captured difference buffer 131A (141). Subsequently, the first storage system 102A transfers the contents of the transferred difference buffer 131B to the received difference buffer 131C of the second storage system 102B (remote copy 143). Next, the second storage system 102B switches the received difference buffer 141C and the applied difference buffer 141D (144). Here, after the foregoing switch, the first storage system 102A once again transfers the contents of the transferred difference buffer 131B to the received difference buffer 131C of the second storage system 102B (remote copy 143). Subsequently, the second storage system 102B applies the contents of the applied difference buffer 141D to the second volume group 1412B (local copy 145).

With this computer system 100, by periodically executing step S112, it is possible to configure a remote copy system capable of constantly configuring a volume having data consistency in the second storage system 102B. The computer system 100 thereafter creates a snapshot 125 where the data consistency of the second volume group 111B is maintained in the third volume group 111C during the operation of the foregoing remote copy system. Data consistency will be described in detail later.

Figure 22:
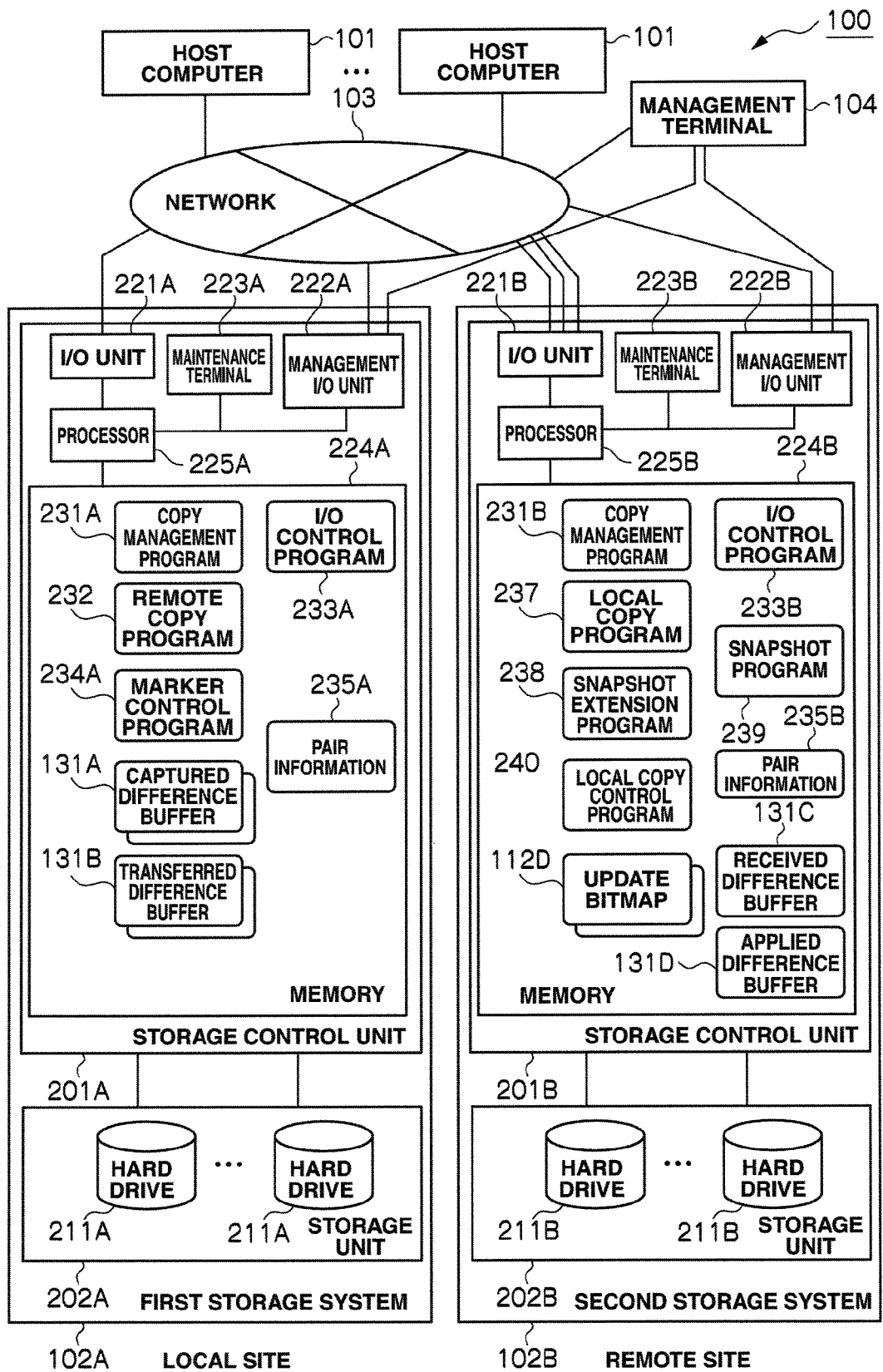
FIG. 22 is a block diagram showing the schematic configuration inside a computer system.

FIG. 22 shows a schematic configuration inside the computer system 100 in the second embodiment. This computer system 100 is configured the same as the computer system 100 in the first embodiment other than that a captured difference buffer 131A and a transferred difference buffer 131 are provided in substitute for the update bitmap 112A, the difference bitmap 112B and the side file 236B in the memory 224A of the storage control unit 201A in the first storage system 102A, a received difference buffer 131C and an applied difference buffer 131D are provided in substitute for the update bitmap 112C in the memory 224B of the storage control unit 201B in the second storage system 102B, and the processing contents of the copy management programs 231A, 231B, the remote copy program 232, the I/O control programs 233A, 233B, and the local copy program 237 are different from the programs of the first embodiment. These programs will be explained in detail later with reference to flowcharts.

FIG. 23 shows a table structure of the captured difference buffer 131A. The captured difference buffer 131A has the items of a volume name 351A, a target address 352A showing the corresponding storage extent of the volume, and a write-target data 353A, and is configured from a list.

With this computer system 100, as another loading method of the captured difference buffer 131A, there is a method of retaining a pointer, in substitute for the write-target data, in the cache of the memory 224A. Here, when the I/O control program 233A is to retain the write-target data in the cache, the used memory volume can be reduced by retaining the write-target data in the cache until the transfer of the remote copy or the I/O access to the storage extent is complete, and retaining a pointer to data on the cache in the captured difference buffer 131A so as to avoid the retention of redundant data.

Incidentally, the table structure of the transferred difference buffer 131B, the received difference buffer 131C and the applied difference buffer 131D is the same as the table structure of the captured difference buffer 131A.

Figure 24:
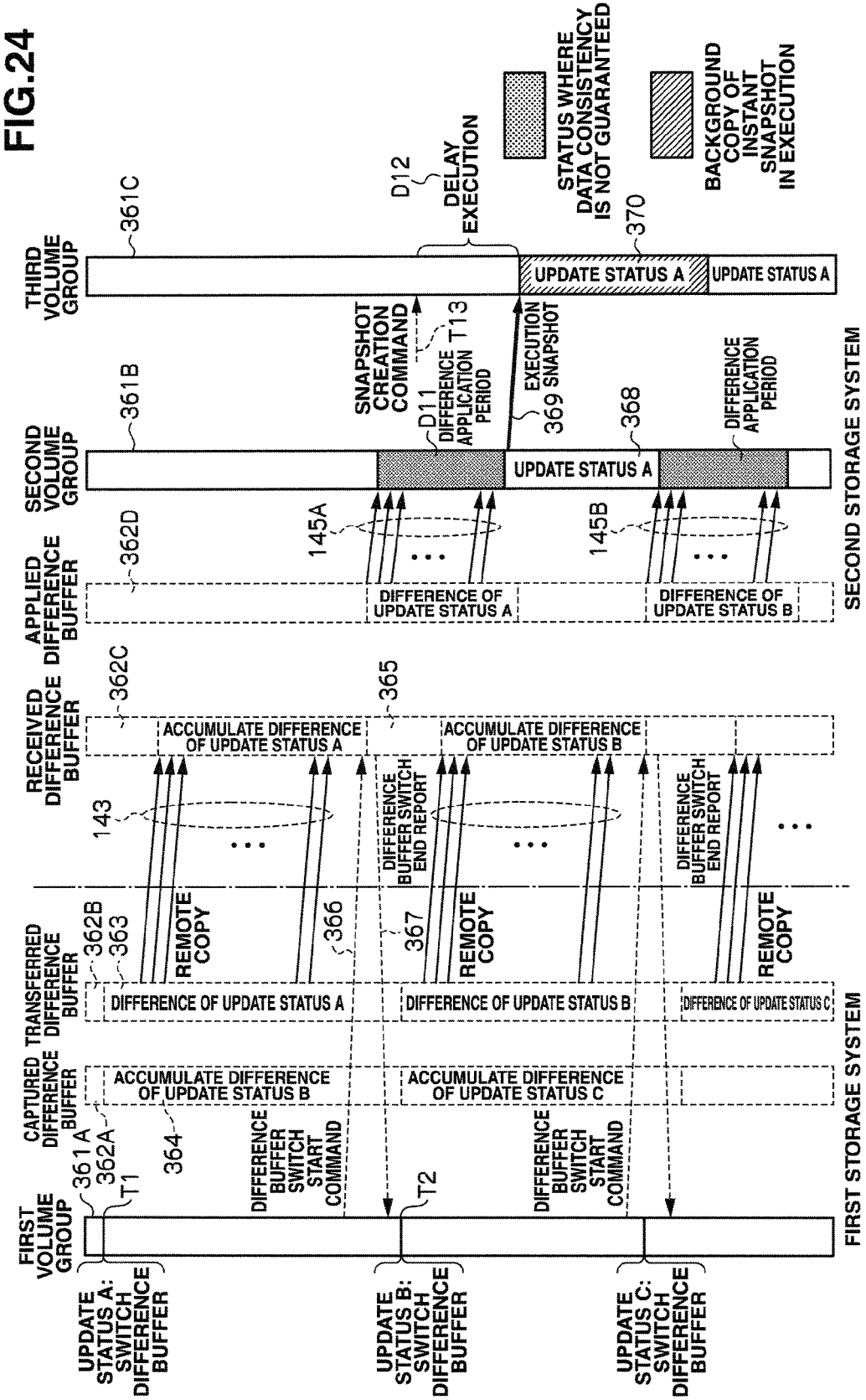
FIG. 24 is a conceptual diagram explaining the update status of the first to third volume groups.

FIG. 24 shows the update status of the first to third volume groups 111A to 111C and the captured difference buffer 131A, the transferred difference buffer 131B, the received difference buffer 131C and the applied difference buffer 131D in a time series. Here, reference number 361A represents the update status of the first volume group 111A in a time series, reference number 361B represents the update status of the second volume group 111B in a time series, reference number 361C represents the update status of the third volume group 111C in a time series, reference number 362A represents the difference data status of the captured difference buffer 131A in a time series, reference number 362B represents the difference data status of the transferred difference buffer 131B in a time series, reference numeral 362C represents the difference data status of the received difference buffer 131C in a time series, and reference number 362D represents the difference data status of the applied difference buffer 131D in a time series.

With the first storage system 102A, if the update status of the first volume group 111A is an update status A at timing T1 of switching the captured difference buffer 131A and the transferred difference buffer 131B, contents of the transferred difference buffer 131B after switching the captured difference buffer 131A and the transferred difference buffer 131B will be an aggregate of write-target data for making the second volume group 111B become an update status A (363).

After switching the captured difference buffer 131A and the transferred difference buffer 131B, the first storage system 102A ongoingly stores the write-target data from the host computer 101 in the captured difference buffer 131A (364). Here, when data is written in the same storage extent upon storing the write-target data in the captured difference buffer 131A, the first storage system 102A is able to reduce the data traffic during the execution of remote copy by deleting the data stored in such storage extent. Further, the first storage system 102A may also manage the referral to from the target address showing the storage extent to the elements in the captured difference buffer 131A with a bitmap. Incidentally, elements in the difference buffer mean the status of data being stored in a prescribed storage extent of the difference buffer.

Subsequently, the first storage system 102A transfers the write-target data of the transferred difference buffer 131B to the received difference buffer 131C of the second storage system 102B (remote copy 143). In the second storage system 102B, after the execution of the remote copy 143, contents of the received difference buffer 131C become an aggregate of write-target data for making the second volume group 111B to become update status A (365).

Subsequently, the first storage system 102A sends a difference buffer switch command to the second storage system 102B (366). Thereby, the second storage system 102B switches the received difference buffer 131C and the applied difference buffer 131D.

Subsequently, the second storage system 102B sends a difference buffer switch end report to the first storage system 102A (367). Thereby, the first storage system 102A will be able to once again switch the captured difference buffer 131A and the transferred difference buffer 131B (142). At timing T2, the captured difference buffer 131A and the transferred difference buffer 131B are switched again, and the same processing steps are thereafter repeated.

Meanwhile, in the second storage system 102B, contents of the applied difference buffer 131D are applied to the second volume group 111B (local copy 115A). Thereupon, since the second storage system 102B applies the write-target data of the applied difference buffer 131D to the second volume group 111B independent from the writing sequence from the host computer 101, data consistency regarding the writing sequence of the second volume group 111B may not be guaranteed (difference application period D11). When the application of write-target data from the applied difference buffer 131D is eventually complete, the update status of the second volume group 111B will become an update status A (368). Thereby, the data consistency of the first volume group 111A and the second volume group 111B will be guaranteed.

As described above, with the computer system 100, since the second storage system 102B has the received difference buffer 131C and the applied difference buffer 131D for accumulating write-target data, it is retaining the necessary write-target data for guaranteeing the data consistency of the second volume group 111B. Thereby, it is possible to configure a remote copy system capable of constantly configuring a volume having data consistency.

Here, when a snapshot creation command is issued from the second volume group 111B to the third volume group 111C at timing T13 (difference application period D11 of the second volume group 111B) during the operation of such remote copy system, the second storage system 102B delays the snapshot execution until the difference application period D11 of the second volume group 111B is complete (delay period D12). Then, the second storage system 102B executes a snapshot when the difference application period D11 of the second volume group 111B is complete (369). Here, the second storage system 102B instantaneously ends the execution of the snapshot itself, and executes a background copy of copying all data of the second volume group 111B to the third volume group 111C within a time limit (370).

Further, when data is written in the second volume group 111B during the background copy, the second storage system 102B applies the write-target data to the second volume group 111B even during the execution of the background copy processing by executing the I/O control program 216B as in the first embodiment described above (S115B).

Figure 25:
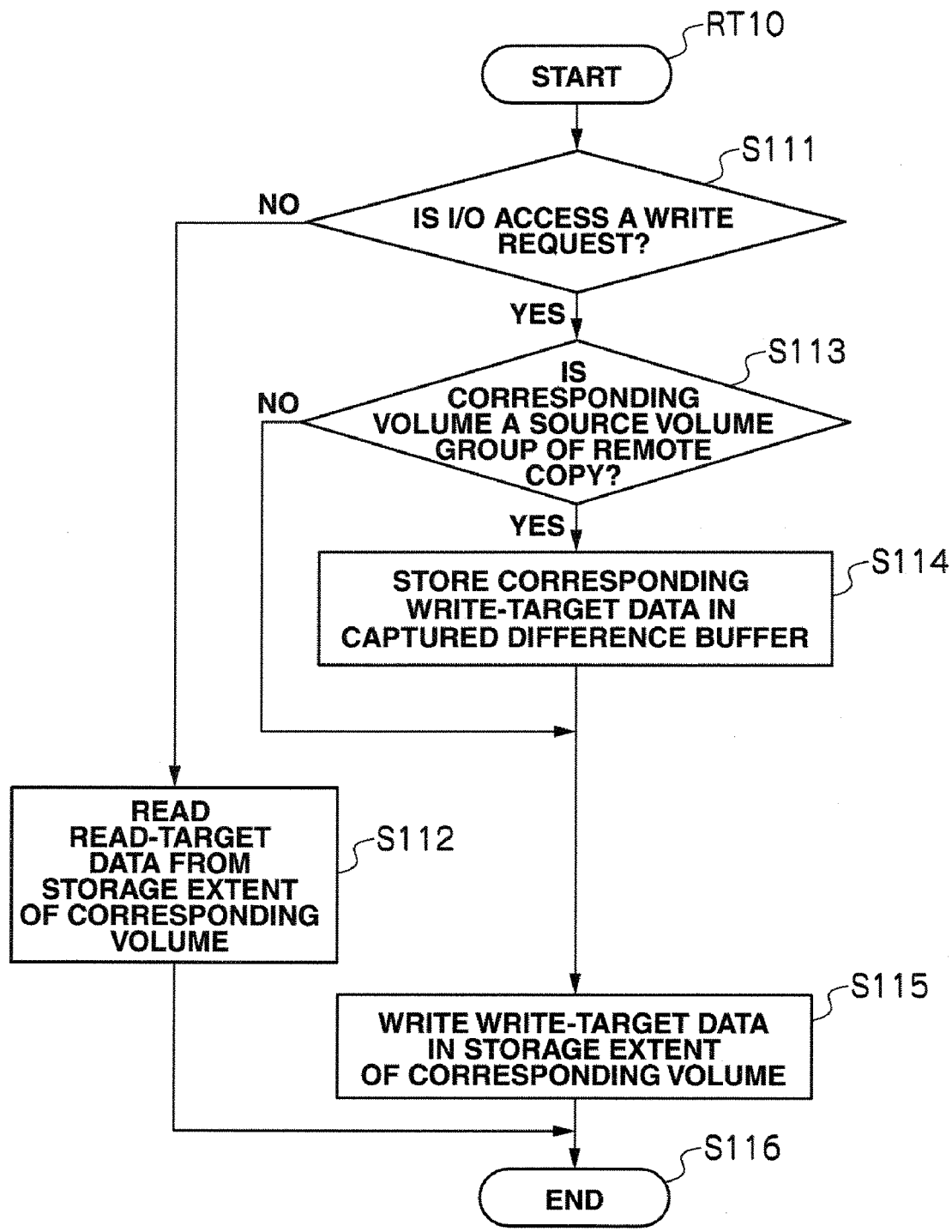
FIG. 25 is a flowchart showing an I/O access processing routine.

An example of I/O access processing (at the local site) of the first storage system 102A in the second embodiment is now explained. FIG. 25 is a flowchart showing a specific processing routine of the processor 225A regarding the I/O access processing in the first storage system 102A.

When the processor 225A receives an I/O access from the host computer 101, it checks whether the type of such I/O access is a write request according to a first I/O access processing routine RT10 shown in FIG. 25 by executing the I/O control program 233A, which is a program for executing the I/O access (S111).

When the type of I/O access is not a write request (S111: NO), the processor 225A determines that the type of I/O access is a read request, and reads read-target data from the storage extent of the volume corresponding to the read request (S112), and thereafter ends the first I/O access processing routine RT10 shown in FIG. 25 (S116).

Contrarily, when the type of I/O access is a write request (S111: YES), the processor 225A checks whether the volume corresponding to the write request is a source volume of the remote copy by referring to the pair information 235A (S113).

When the volume corresponding to the write request is not a source volume of the remote copy (S113: NO), the processor 225A proceeds to step S115. Contrarily, when the volume corresponding to the write request is a source volume of the remote copy (S113: YES), the processor 225A stores the write-target data corresponding to the write request in the captured difference buffer 131A (S114).

Eventually, the processor 225A writes the write-target data in the storage extent of a volume corresponding to the write request (S115), and thereafter ends the first I/O access processing routine RT10 shown in FIG. 25 (S116).

Incidentally, the processor 225A is able to read the read-target data from the storage extent of a volume corresponding to the read request according to a method of making the host computer 101 or a program refer to the data disposed in a cache of the memory 224A, or a method of reading data from a corresponding hard drive of the storage unit 202A and making the host computer 101 or various program refer to such data.

Incidentally, when the processor 225A is to store the write-target data in the captured difference buffer 131A, if the write-target data has already been stored in the same storage extent of the difference capture buffer 131A, it is able to reduce the data volume of the captured difference buffer 131A by overwriting such elements with the write-target data, and reduce the data traffic to the second storage system 102B. Furthermore, the processor 225A realizes the reading and writing of data with the same method as the first embodiment.

Figure 26:
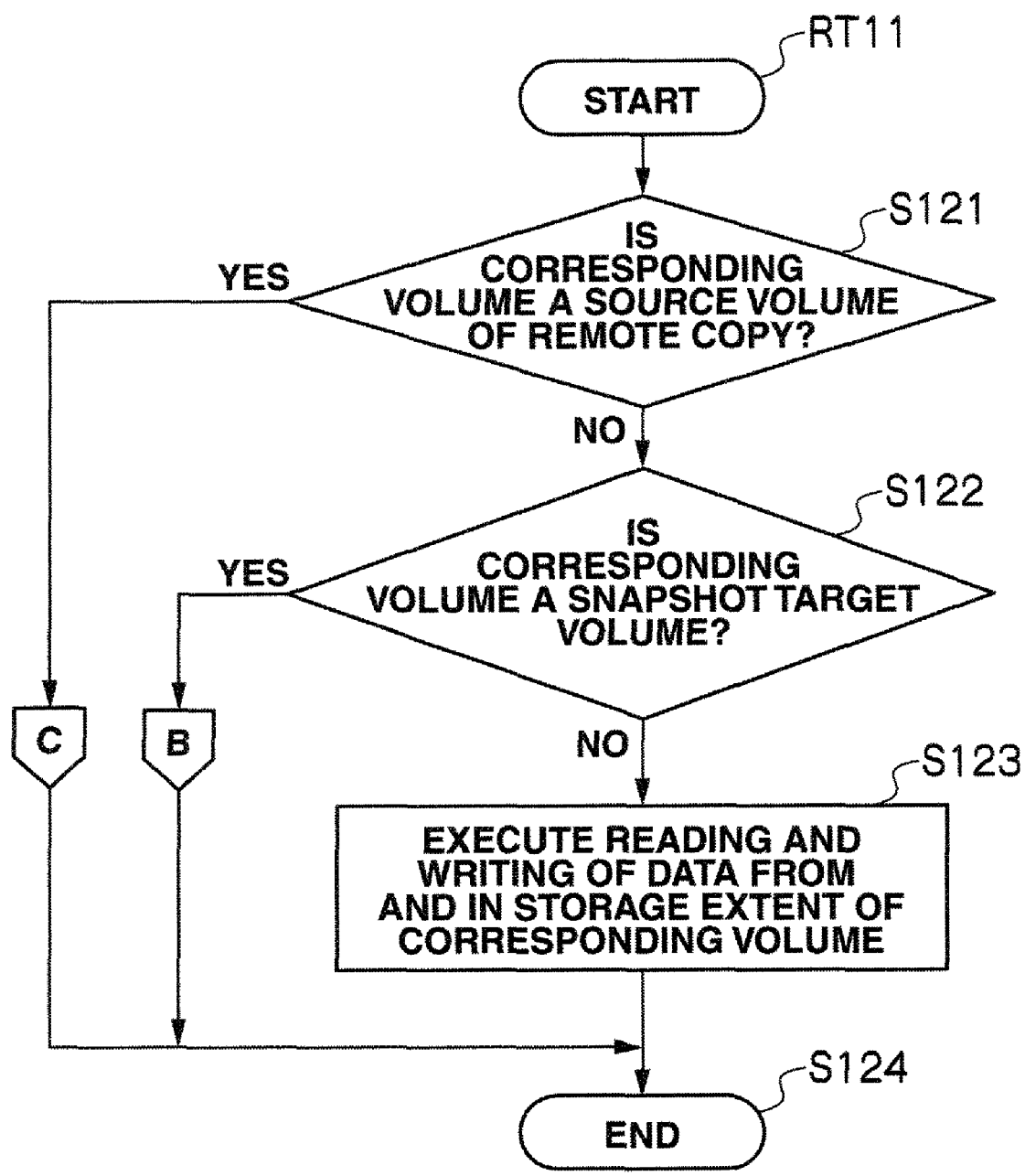
FIG. 26 is a flowchart showing an I/O access processing routine.
Figure 27:
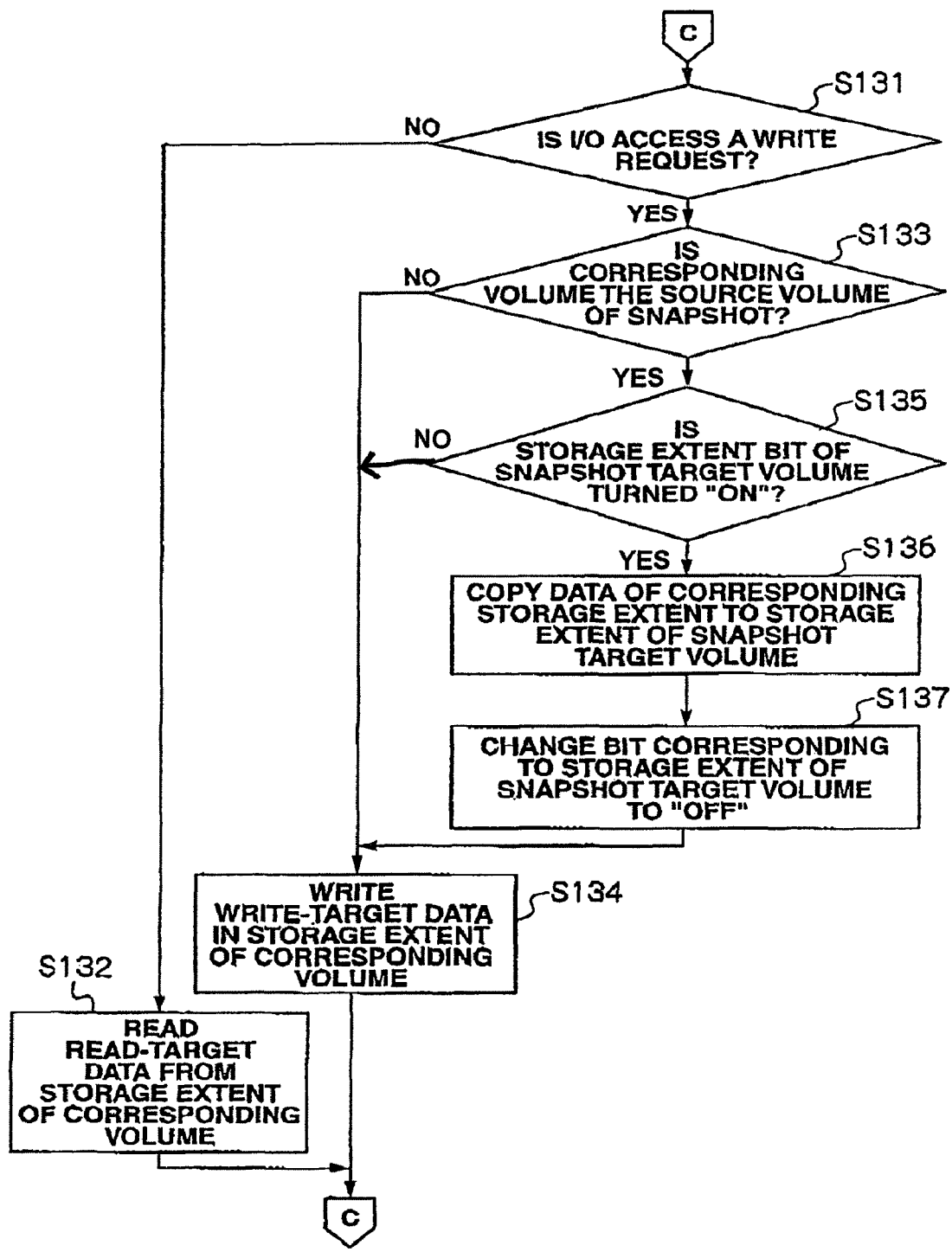
FIG. 27 is a flowchart showing an I/O access processing routine.

An example of I/O access processing (at the remote site) of the second storage system 102B in the second embodiment is now explained. FIG. 26 and FIG. 27 are flowcharts showing a specific processing routine of the processor 225B regarding the I/O access processing in the second storage system 102B.

When the processor 225B receives an I/O access from the host computer 101, or receives an I/O access request as a result of the remote copy program 232 of the first storage system 102A being executed, it executes the I/O control program 223B, which is a program for executing the I/O access, for checking whether the volume corresponding to the I/O access is a target volume of a remote copy by referring to the pair information 235B according to a second I/O access processing routine RT11 shown in FIG. 26 and FIG. 27 (S121).

When the volume corresponding to the I/O access is not a target volume of a remote copy (S121: NO), the processor 225B checks whether the volume corresponding to the I/O access is a snapshot target volume by referring to the pair information 235B (S122).

When the volume corresponding to the I/O access is not a snapshot target volume (S122: NO), the processor 225B executes the reading and writing of data from and in the storage extent of a volume corresponding to the I/O access (S123), and thereafter ends the second I/O access processing routine RT11 shown in FIG. 26 and FIG. 27.

Contrarily, when the volume corresponding to the I/O access is a target volume of a remote copy (S121: YES), the processor 225B checks whether the type of I/O access is a write request (S131) (FIG. 27).

When the type of I/O access is not a write request (S131: NO), the processor 225B determines that the type of I/O access is a read request, reads the read-target data from the storage extent of a volume corresponding to the read request (S132), and thereafter ends the second I/O access processing routine RT11 shown in FIG. 26 and FIG. 27 (S124).

Contrarily, when the type of I/O access is a write request (S131: YES), the processor 225B checks whether the volume corresponding to the write request is a snapshot source volume by referring to the pair information 235B (S133).

When the volume corresponding to the write request is not a snapshot source volume (S133: NO), the processor 225B writes the write-target data in the storage extent of a volume corresponding to the write request (S134), and thereafter ends the second I/O access processing routine RT11 shown in FIG. 26 and FIG. 27 (S124).

Contrarily, when the volume corresponding to the write request is a snapshot source volume (S133: YES), the processor 225B checks whether the storage extent of such snapshot target volume is "ON" (S135).

When such snapshot target volume is not "ON" (S135: NO), the processor 225B writes the write-target data in the storage extent of a volume corresponding to the write request (S134), and thereafter ends the second I/O access processing routine RT11 shown in FIG. 26 and FIG. 27 (S124).

Contrarily, when such snapshot target volume is "ON" (S135: YES), the processor 225B copies the data currently stored in the storage extent of a volume corresponding to the write request in the storage extent of the snapshot target volume (S136).

Subsequently, the processor 225B changes the storage extent of a snapshot target volume to "OFF" (S137).

Eventually, the processor 225B writes the write-target data in the storage extent of a volume corresponding to the write request (S134), and thereafter ends the second I/O access processing routine RT11 shown in FIG. 26 and FIG. 27 (S124). Incidentally, the processor 225B realizes the reading and writing of data with the same method as the first embodiment.

Figure 28:
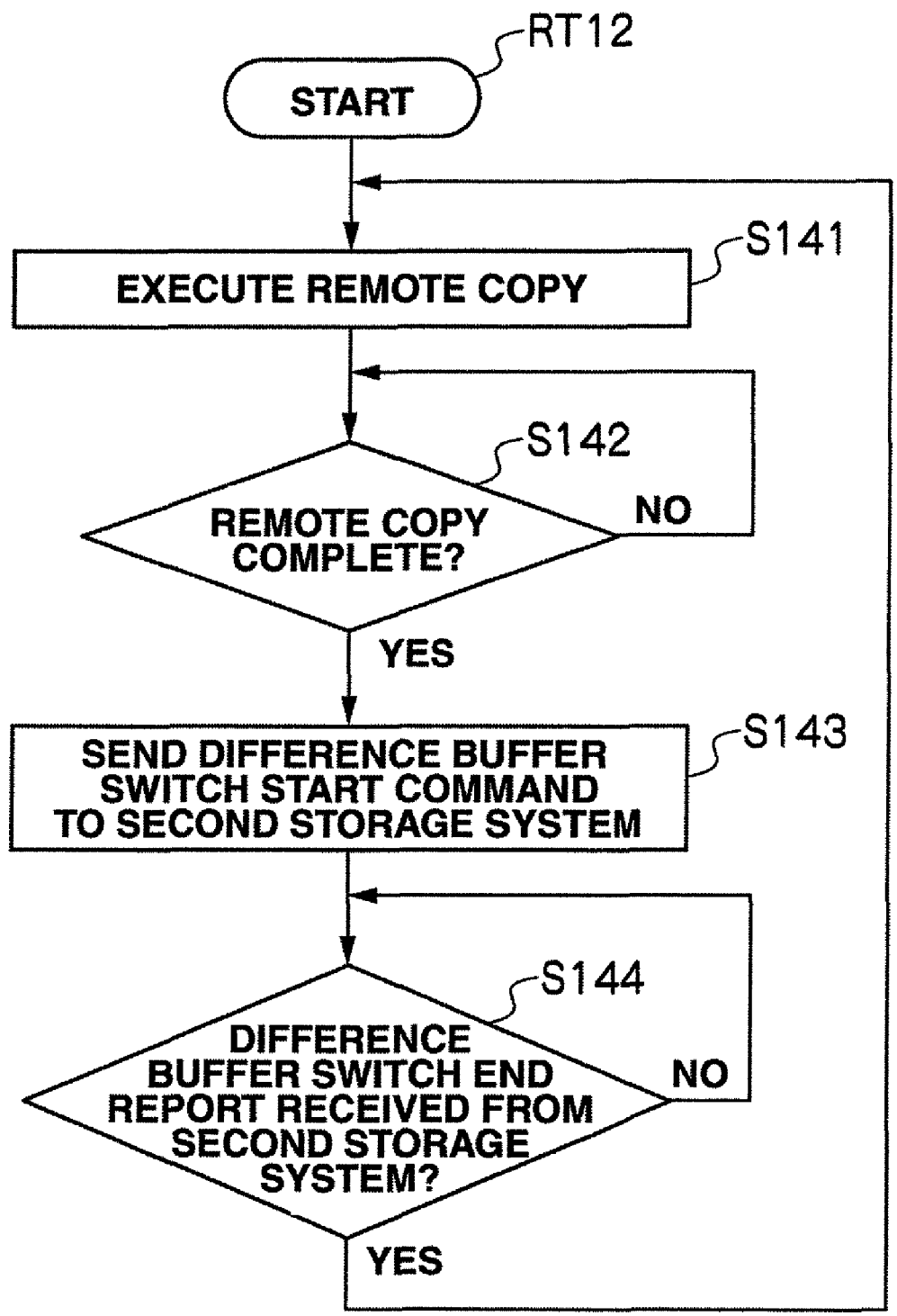
FIG. 28 is a flowchart showing a copy management processing routine.

An example of copy management processing (at the local site) of the first storage system 102A in the second embodiment is now explained. FIG. 28 is a flowchart showing a specific processing routine of the processor 225A regarding the copy management processing in the first storage system 102A.

The processor 225A executes the remote copy 143 according to a first copy management processing routine RT12 shown in FIG. 28 by executing in a prescribed timing the copy management program 231A, which is a program for executing the copy management (S141). Subsequently, the processor 225A waits in a standby mode for the remote copy 143 to be completed (S142). When the remote copy 143 is eventually complete (S142: YES), the processor 225A sends a difference buffer switch start command to the second storage system 102B (S143).

Subsequently, the processor 225A waits in a standby mode to receive a difference buffer switch end report from the second storage system 102B (S144). When the processor 225A eventually receives the difference buffer switch end report from the second storage system 102B (S144: YES), it thereafter once again executes the remote copy 143 (S141), returns to a standby mode and waits for the remote copy 143 to be completed (S142), and thereafter repeats the same processing steps (S141 to S144).

Figure 29:
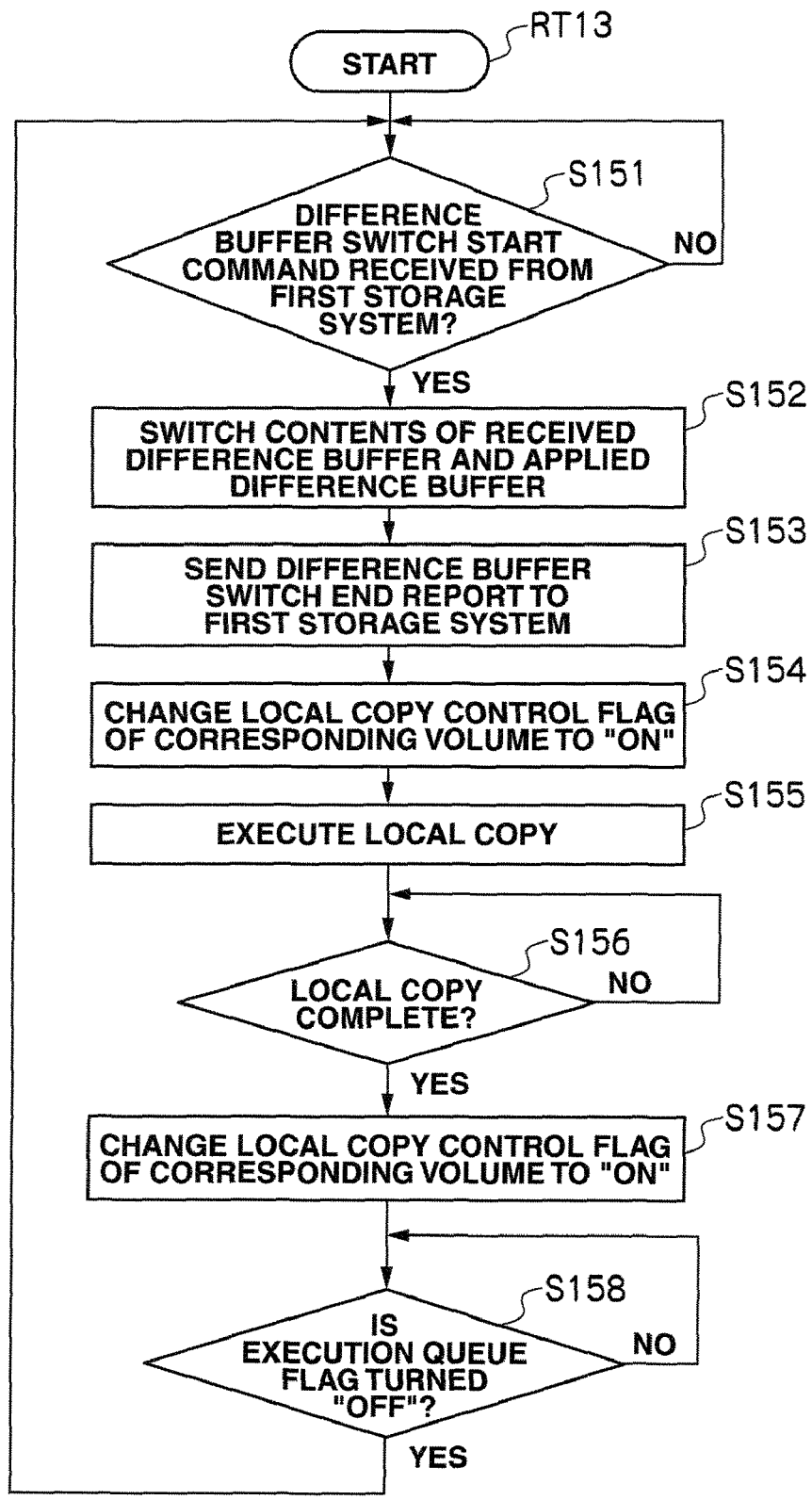
FIG. 29 is a flowchart showing a copy management processing routine.

An example of copy management processing (at the remote site) of the second storage system 102B in the second embodiment is now explained. FIG. 29 is a flowchart showing a specific processing routine of the processor 225B regarding the copy management processing in the second storage system 102B.

The processor 225B initially waits in a standby mode to receive a difference buffer switch start command from the first storage system 102A according to a second copy management processing routine RT13 shown in FIG. 29 by executing the copy management program 231B, which is a program for executing the copy management (S151). When the processor 225B eventually receives the difference buffer switch start command from the first storage system 102A (S151: YES), it switches the contents of the received difference buffer 131C and the applied difference buffer 131D (S152).

Subsequently, the processor 225B sends a difference buffer switch end report to the first storage system 102A (S153). Next, the processor 225B changes the local copy control flag 332 of a volume corresponding to the difference buffer switch start command in the local copy control data 240 to "OFF" (S154). Then, the processor 225B executes the local copy 145 of a volume corresponding to the difference buffer switch start command (S155).

Subsequently, the processor 225B waits in a standby mode for the local copy 145 to be completed (S156). Eventually, when the local copy 145 is complete (S156: YES), the processor 225B changes the local copy control flag 332 of a volume corresponding to the difference buffer switch start command in the local copy control data 240 to "ON" (S157).

Subsequently, the processor 225B checks whether the execution queue flag 333 of a volume corresponding to the difference buffer switch start command in the local copy control data 240 is "OFF" (S158).

When the execution queue flag 333 of a volume corresponding to the difference buffer switch start command in the local copy control data 240 is not "OFF" (S158: NO), the processor 225B waits in a standby mode for the copy control flag 332 of the source volume to be turned "OFF". Contrarily, when the execution queue flag 333 of a volume corresponding to the difference buffer switch start command in the local copy control data 240 is "OFF" or is turned "OFF" (S158: YES), the processor 225B thereafter once again returns to a standby mode and waits to receive a difference buffer switch start command from the first storage system 102A (S151), and then repeats the same processing steps (S151 to S158).

Incidentally, the processor 225B changes the local copy control flag 332 of a volume corresponding to the difference buffer switch start command in the local copy control data 240 to "OFF" at step S154, and changes the local copy control flag 332 of a volume corresponding to the difference buffer switch start command in the local copy control data 240 to "ON" at step S157. Like this, the second embodiment is opposite to the second copy management processing routine RT4 shown in FIG. 15 of the first embodiment, and the reason for this is because the execution of the local copy 145 is the application of contents of the applied difference buffer 131D to the second volume group 111B, and, since the second volume group 111B will be a snapshot source volume group, data consistency during the execution of the local copy 145 is not guaranteed.

Figure 30:
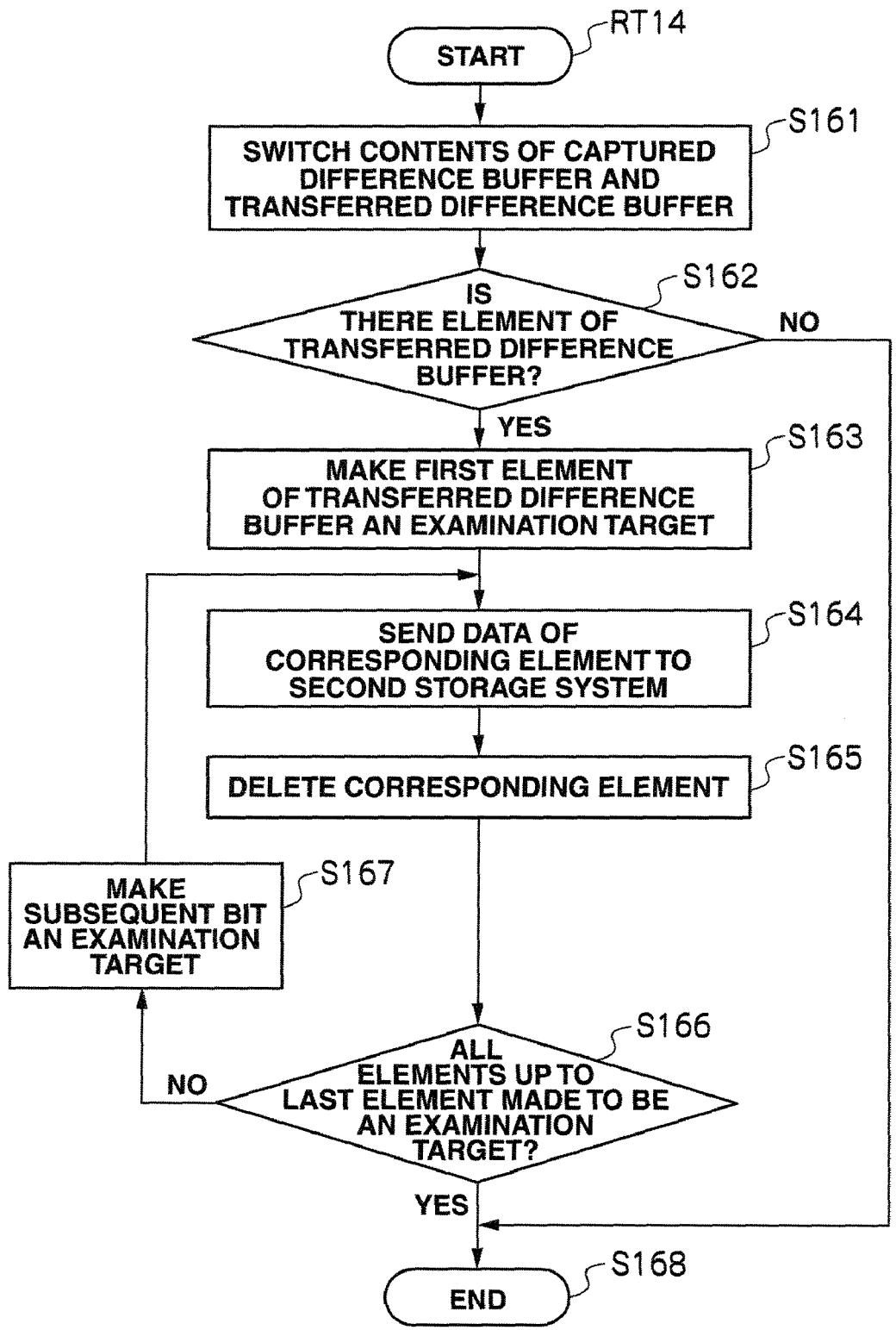
FIG. 30 is a flowchart showing a remote copy processing routine.

An example of remote copy processing of the first storage system 102A in the second embodiment is now explained. FIG. 30 is a flowchart showing a specific processing routine of the processor 225A regarding the remote copy processing in the first storage system 102A.

The processor 225A switches the contents of the captured difference buffer 131A and the transferred difference buffer 131B according to a remote copy processing routine RT14 shown in FIG. 30 by executing in a prescribed timing the remote copy program 232, which is a program for executing the remote copy 143 with the copy management program 231A (S161).

Subsequently, the processor 225A checks whether there are elements of the transferred difference buffer 131B (S162).

When there are no elements of the transferred difference buffer 131B (S162: NO), the processor 225A thereafter ends the remote copy processing routine RT14 shown in FIG. 30 (S168). Contrarily, when there are elements of the transferred difference buffer 131B (S162: YES), the processor 225A makes the first element of the transferred difference buffer 131B an examination target (S163).

Subsequently, the processor 225A sends data of elements of the transferred difference buffer 131B to be examined to the second storage system 102B (S164). Next, the processor 225A deletes data of elements of the transferred difference buffer 131B to be examined (S165).

Subsequently, the processor 225A checks whether all elements up to the last element of the transferred difference buffer 131B have been made to be an examination target (S166). When all elements up to the last element of the transferred difference buffer 131B have not been made to be an examination target (S166: NO), the processor 225A makes the subsequent element of the transferred difference buffer 131B an examination target (S167), thereafter once again sends the data of the element of the transferred difference buffer 131B to be examined to the second storage system 102B (S164), and then repeats the same processing steps (S164 to S166).

Contrarily, when all elements up to the last element of the transferred difference buffer 131B have been made to be an examination target (S166: YES), the processor 225A thereafter ends the remote copy processing routine RT14 shown in FIG. 30 (S168).

Figure 31:
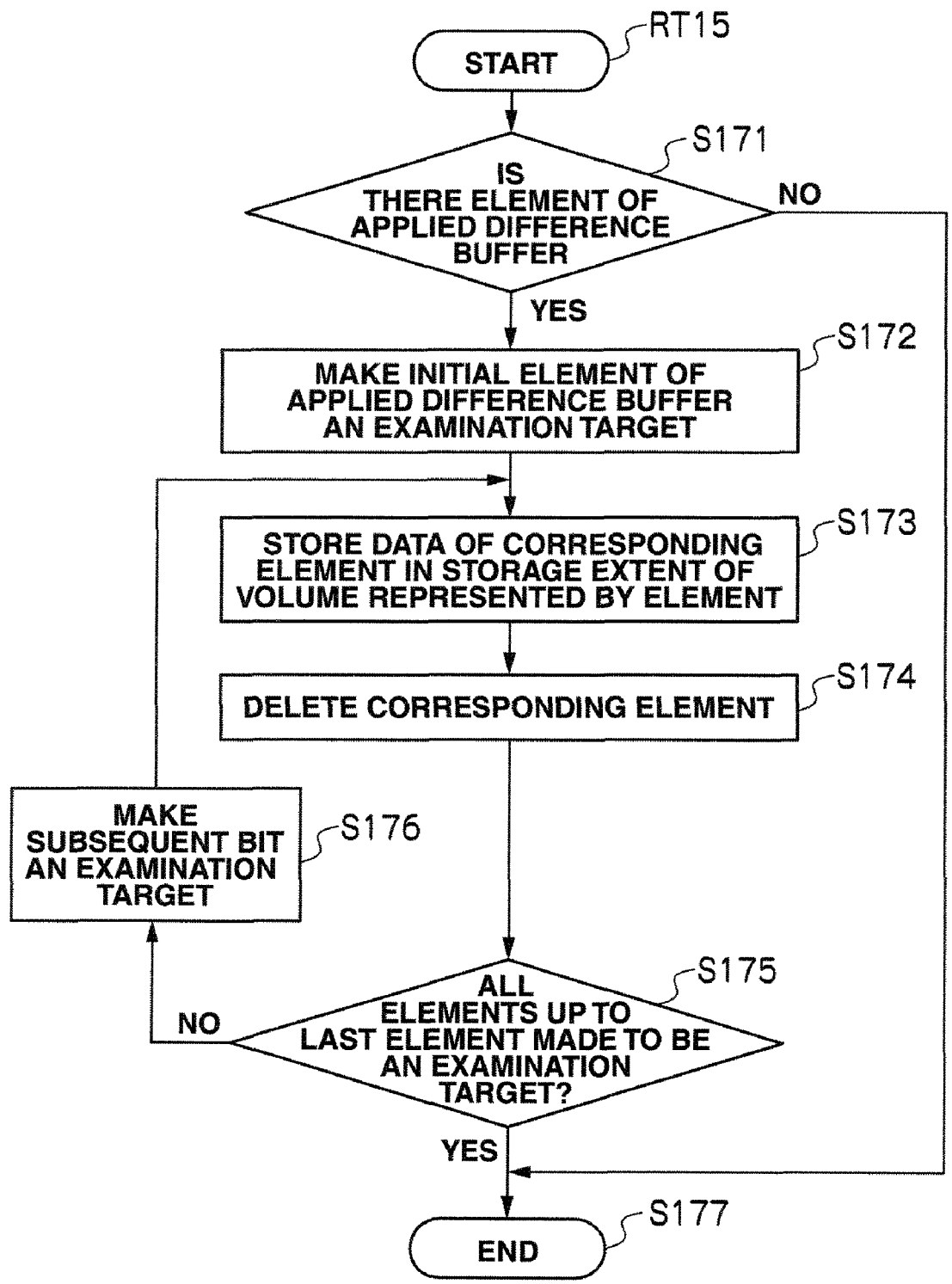
FIG. 31 is a flowchart showing a local copy processing routine.

An example of local copy processing of the second storage system 102B in the second embodiment is now explained. FIG. 31 is a flowchart showing a specific processing routine of the processor 225B concerning the local copy processing in the second storage system 102B.

When the processor 225B receives a difference buffer switch start command from the first storage system 102A, it checks whether there are elements of the applied difference buffer 131D according to a local copy processing routine RT15 shown in FIG. 31 by executing the local copy program 237, which is a program for executing the local copy 145 with the copy management program 231B (S171). When there are no elements of the applied difference buffer 131D (S171: NO), the processor 225B thereafter ends the local copy processing routine RT15 shown in FIG. 31 (S177). Contrarily, when there are elements of the applied difference buffer 131D (S171: YES), the processor 225B makes the first element of the applied difference buffer 131D an examination target (S172).

Subsequently, the processor 225B stores data of elements of the applied difference buffer 131D to be examined in the storage extent of a volume showing such elements (S173). Next, the processor 225A deletes data of elements of the applied difference buffer 131D to be examined (S174).

Subsequently, the processor 225B checks whether all elements up to the last element of the applied difference buffer 131D have been made to be an examination target (S175). When all elements up to the last element of the applied difference buffer 131D have not been made to be an examination target (S175: NO), the processor 225A makes the subsequent element of the applied difference buffer 131D an examination target (S176), thereafter once again sends the data of the element of the applied difference buffer 131D to be examined to the storage system of a volume showing such elements (S173), and then repeats the same processing steps (S173 to S175).

Contrarily, when all elements up to the last element of the applied difference buffer 131D have been made to be an examination target (S175: YES), the processor 225B thereafter ends the local copy processing routine RT15 shown in FIG. 31 (S177). As described above, with the computer system 100 in the second embodiment, since the second storage system 102B has the received difference buffer 131C and the applied difference buffer 131D for accumulating write-target data, it is retaining the necessary write-target data for guaranteeing the data consistency of the second volume group 111B. Thereby, it is possible to configure a remote copy system capable of constantly configuring a volume having data consistency.

(3) Third Embodiment

A method of using a marker will be explained in the third embodiment. The computer system in the third embodiment is configured the same as the computer system in the first or second embodiment excluding the point of using a marker. A marker is an identifier representing the status of a volume, and the host computer 101 or the like issues a marker creation command to the first storage system 102A at a certain point in time. For example, when a condition such as "certain important data has been written" in a prescribed volume group is satisfied, the host computer 101 issues a designated marker creation command. Thereafter, upon creating a snapshot of the second volume group 111B during the operation of the remote copy system with the second storage system 1028 at the remote site, the computer system 100 creates a snapshot of a volume group satisfying a specified condition via a method using a marker.

Figure 32:
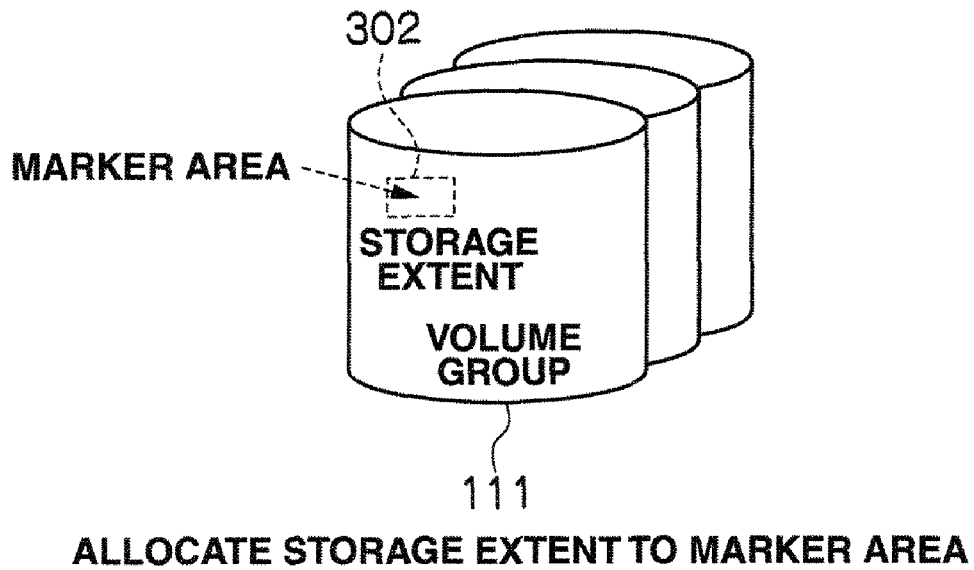
FIG. 32 is a conceptual diagram explaining a marker.

FIG. 32 shows the structure of a marker in the third embodiment. A marker is used for representing the status of a prescribed volume group. The storage extent 302 corresponding one-on-one with a prescribed volume group 111 is allocated as a marker area. For instance, with the computer system 100, a method of securing the storage extent 302 in the memory 224A of the storage control unit 201A, or a method of securing the storage extent 302 in a part of the volume group 111 can be considered.

Figure 33:
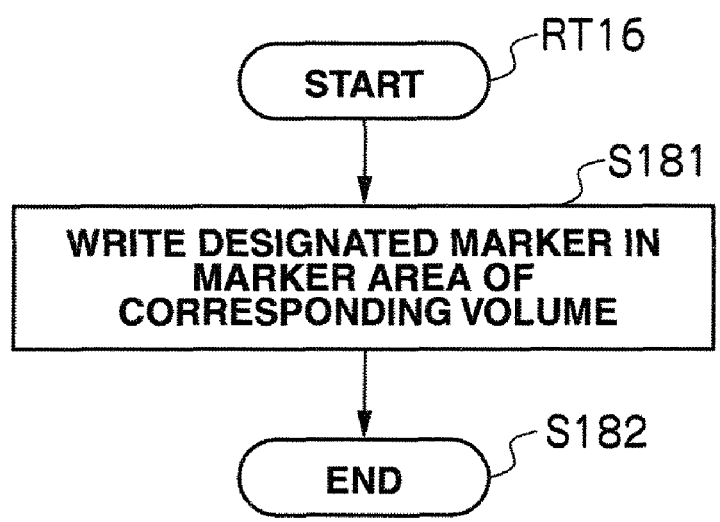
FIG. 33 is a flowchart showing a marker processing routine.

FIG. 33 is a flowchart showing a specific processing routine of the processor 225A regarding the marker processing of the first storage system 102A in the third embodiment. When the processor 225A receives a marker creation command based on a command of a user or a program from the host computer 101 or management terminal 104, or other maintenance terminals 223A, 223B or programs, it writes a designated marker in the marker area of a volume corresponding to the marker creation command according to a marker processing routine RT16 shown in FIG. 33 by executing the marker control program 234, which is a program for executing the marker creation processing (S181), and thereafter ends the marker processing routine RT16 shown in FIG. 33 (S182).

Figure 34:
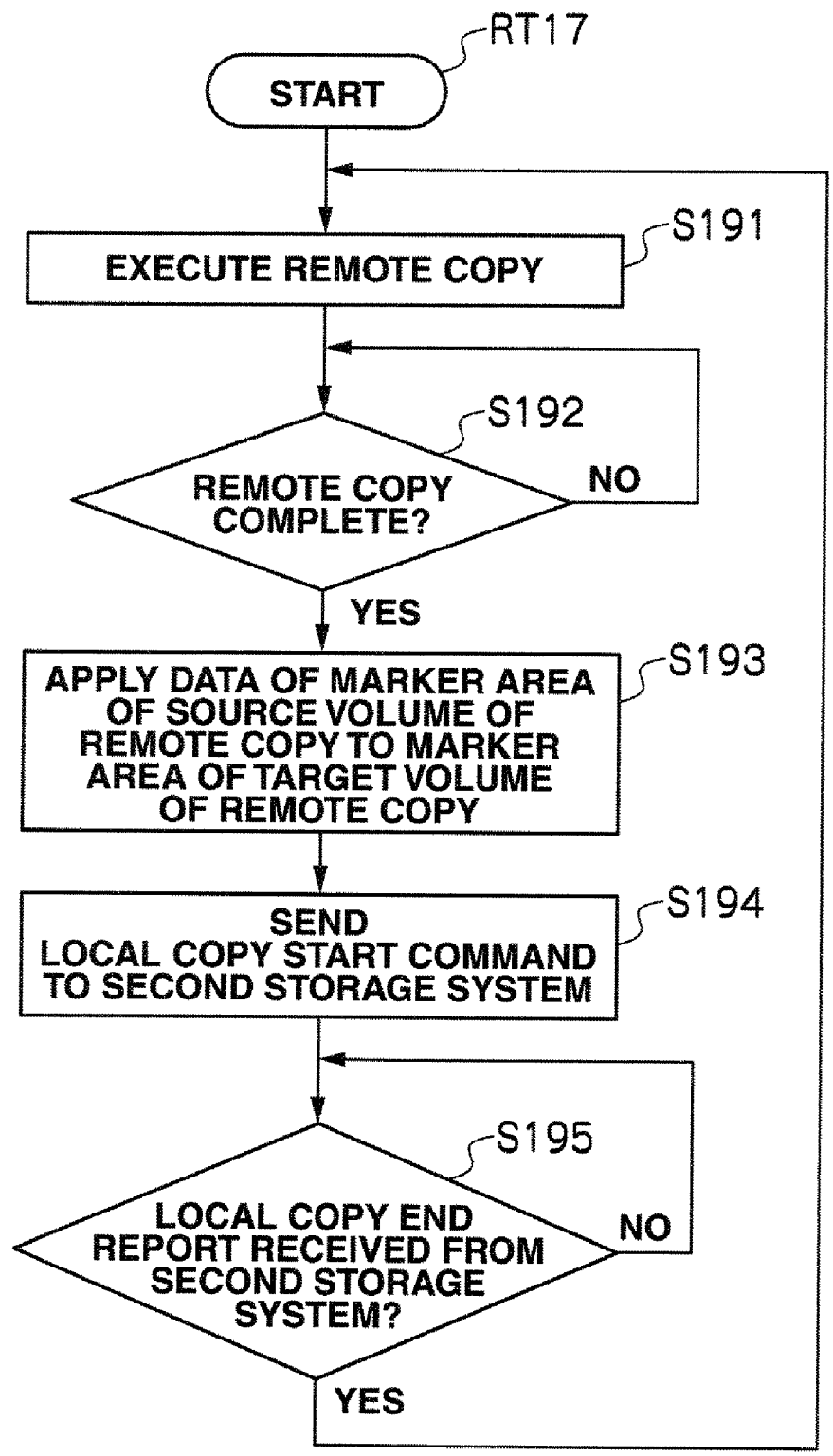
FIG. 34 is a flowchart showing a copy management processing routine.

An example of copy management processing (at the local site) of the first storage system 102A in the third embodiment is now explained. FIG. 34 is a flowchart showing a specific processing routine of the processor 225A regarding the copy management processing in the first storage system 102A.

The processor 225A executes the remote copy 122 according to a first copy management processing routine RT17 shown in FIG. 34 by executing in a prescribed timing the copy management program 231A, which is a program for executing the copy management (S191). Subsequently, the processor 225A waits in a standby mode for the remote copy 122 to be completed (S192). When the remote copy 122 is eventually complete (S192: YES), the processor 225A applies data of a marker area of the source volume of the remote copy to a marker area of the target volume of the remote copy (S193).

Here, for instance, when the processor 225A allocated a marker area to the storage extent of the volume 111, it applies this to the marker area as with the transfer of the write-target data to the second storage system 102B in the remote copy. Further, for instance, when the processor 225A allocated a marker area to the storage extent 303 in the memory 224A, it applies this to the marker area by transferring the data of the marker area at the time of application to the second storage system 102B via the network 103, and writing data transferred to the second storage system 102B from the first storage system 102A in the storage extent 302 in the memory 224B before the execution of the local copy. Further, the processor 225A applies this to the marker area even during the execution of the remote copy.

Subsequently, the processor 225A sends a local copy start command to the second storage system 102B (S194). Next, the processor 225A waits in a standby mode to receive a local copy end report from the second storage system 102B (S195). When the processor 225A eventually receives the local copy end report from the second storage system 102B (S195: YES), it thereafter once again executes the remote copy 122 (S191), returns to a standby mode and waits for the remote copy 122 to be completed (S192), and thereafter repeats the same processing steps (S191 to S195).

Incidentally, in this embodiment, although a case was explained where the specific processing routine of the processor 225A regarding the copy management processing in the first embodiment was explained, the same applies to a case of employing the specific processing routine of the processor 225A regarding the copy management processing in the second embodiment.

Figure 35:
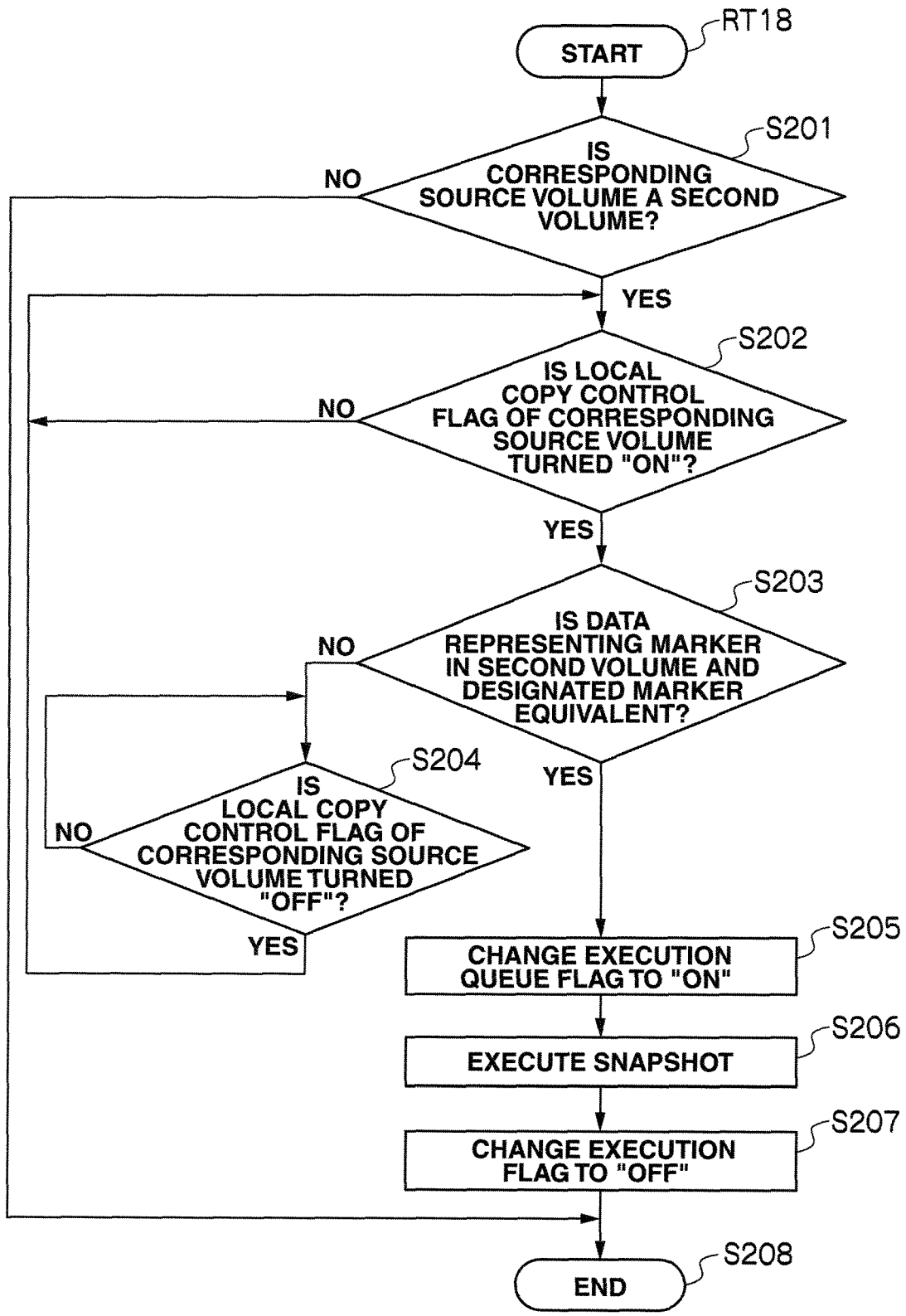
FIG. 35 is a flowchart showing an extended snapshot processing routine.

An example of extended snapshot processing of the second storage system 102B in the third embodiment is now explained. FIG. 35 is a flowchart showing a specific processing routine of the processor 225B regarding the extended snapshot processing in the second storage system 102B.

When the processor 225B receives the input of a designated marker based on a command of a user or a program from the host computer 101 or management terminal 104, or other maintenance terminals 223A, 223B or programs, it executes the snapshot extension program 238, which is a program for executing the snapshot 125 based on the snapshot creation command, for checking whether the source volume corresponding to the designated marker is a volume of the second volume group 111B by referring to the pair information 235B according to an extended snapshot processing routine RT18 shown in FIG. 35 (S201).

When the source volume corresponding to the input of the designated marker is not a volume of the second volume group 111B (S201: NO), the processor 225B thereafter ends the extended snapshot processing routine RT18 shown in FIG. 35 (S208). Contrarily, when the source volume corresponding to the input of the designated marker is a volume of the second volume group 111B (S201: YES), the processor 225B checks whether the local copy control flag 332 of a source volume corresponding to the input of the designated marker in the local copy control data 240 is "ON" (S202).

When the local copy control flag 332 of a source volume corresponding to the input of the designated marker in the local copy control data 240 is not "ON" (S202: NO), the processor 225B waits in a standby mode for the local copy control flag 332 of the source volume to be turned "ON". Contrarily, when the local copy control flag 332 of a source volume corresponding to the input of the designated marker in the local copy control data 240 is "ON" or is turned "ON" (S202: YES), the processor 225B checks whether the data representing the marker and the designated marker are equivalent in the volume of the second volume group 111B (S203).

When the data representing the marker in the volume of the second volume group 111B and the designated marker are not equivalent (S203: NO), the processor 225B checks whether the local copy control flag 332 of a source volume corresponding to the input of the designated marker in the local copy control data 240 is "OFF" (S204). When the local copy control flag 332 of a source volume corresponding to the input of the designated marker in the local copy control data 240 is not "OFF" (S204: NO), the processor 225B waits in a standby mode for the local copy control flag 332 of such source volume to be turned "OFF". Contrarily, when the local copy control flag 332 of a source volume corresponding to the input of the designated marker in the local copy control data 240 is "OFF" or is turned "OFF" (S204: YES), the processor 225B checks whether the local copy control flag 332 of a source volume corresponding to the input of the designated marker in the local copy control data 240 is "ON" (S202), and then repeats the same processing steps (S202 to S204).

Contrarily, when the data representing the marker in the volume of the second volume group 111B and the designated marker are equivalent (S203: YES), the processor 225B changes the execution queue flag 333 of a source volume corresponding to the input of the designated marker in the local copy control data 240 to "ON" (S205).

Subsequently, the processor 225B executes the snapshot 125 from a source volume corresponding to the input of the designated marker to the corresponding target volume (S206). Next, the processor 225B changes the execution queue flag 333 of a source volume corresponding to the input of the designated marker in the local copy control data 240 to "OFF" (S207). Eventually, the processor 225B thereafter ends the extended snapshot processing routine RT18 shown in FIG. 35 (S208).

Accordingly, with the computer system 100 in the third embodiment, it is possible to create a snapshot when the data representing the marker in the volume of the second volume group 111B and the designated marker coincide, and the local copy control flag 332 corresponding to the input of the designated marker in the local copy control data 240 is "ON".

The present invention can be broadly applied to a computer system in which the host computer and the storage system are connected via a network, and which stores data processed with the host computer in the storage system by sending and receiving such data via the network.

What is claimed is:

1. A storage system comprising:
   a first storage system including:
      a first volume which includes a first data area storing data sent from a computer and a first marker area storing a first marker which corresponds to the data stored in the first volume; and
      a first processor which stores data sent from the computer in the first volume;
   a second storage system including:
      a second volume which includes a second data area and a second marker area storing the first marker;
      a third volume; and
      a second processor which is configured to store data sent from the first storage system in the second volume;
   wherein the first processor transfers the data stored in the first data area of the first volume in the first storage system, to the second storage system, and the second processor stores the data in the second data area of the second volume, wherein after the first processor transfers the data stored in the first data area to the second storage system, the first processor transfers the first marker stored in the first marker area to the second storage system, and the second processor stores the first marker in the second marker area of the second volume, wherein the second processor checks whether transferring the data stored in the first data area and the first marker stored in the first marker area to the second storage system, is completed, wherein the second processor checks whether the first marker stored in the second storage area of the second volume corresponds to a second marker designated by the computer, and wherein, if transferring the data stored in the first data area and the first marker stored in the first marker area to the second storage system is completed and the first marker stored in the second storage are of the second volume is a second marker designated by the computer, the second processor creates a snapshot of the data that is stored in the second data area, in the third storage volume.

2. A storage system according to claim 1,
wherein when the first processor receives a marker creation request from the computer for creating a marker corresponding to the data stored in the first data area, and the first processor writes the first marker in the first marker area in the first volume.

3. A storage system according to claim 1,
wherein the second processor receives a local copy start command to command a local copy start for the second storage system, and provides a local copy end report output at a local copy end operation.

4. A storage system according to claim 1,
wherein the second processor checks and waits until a local copy control flag of the data that is stored in the second data area, is a predetermined value, before executing the snapshot.

5. A storage system comprising:
a first storage system including:
a first volume storing data sent from a computer;
a first memory storing a first marker which corresponds to the data stored in the first volume; and
a first processor which stores data sent from the computer in the first volume;
a second storage system including:
a second volume;
a third volume;
a second memory; and
a second processor which stores the data sent from the first storage system in the second volume;
wherein the first processor transfers the data stored in the first volume in the first storage system to the second storage system, and the second processor stores the data in the second volume,
wherein after the first processor transfers the data stored in the first volume to the second storage system, the first processor transfers the first marker stored in the first memory to the second storage system, and the second processor stores the first marker in the second memory in the second storage system,
wherein the second processor checks whether transferring the data stored in the first data area and the first marker stored in the first memory to the second storage system, is completed,
wherein the second processor checks whether the first marker stored in the second memory corresponds to a second marker designated by the computer, and wherein, if transferring the data stored in the first data area and the first marker stored in the first memory to the second storage system is completed and the first marker stored in the second memory is the second marker designated by the computer, the second processor creates a snapshot of the data that is stored in the second data area, in the third storage volume.

6. A snapshot method carried out in a storage system including:
a first storage system including:
a first volume which includes a first data area storing data sent from a computer and a first marker area storing a first marker which corresponds to the data stored in the first volume; and
a first processor which stores data sent from the computer in the first volume;
a second storage system including:
a second volume which includes a second data area and a second marker area storing the first marker;
a third volume; and
a second processor which is configured to store data sent from the first storage system in the second volume;
the snapshot method comprising operations of:
the first processor transferring the data stored in the first data area of the first volume in the first storage system, to the second storage system, and the second processor stores the data in the second data area of the second volume,
after the first processor transfers the data stored in the first data area to the second storage system, the first processor transferring the first marker stored in the first marker area to the second storage system, and the second processor stores the first marker in the second marker area of the second volume,
wherein the second processor checks whether transferring the data stored in the first data area and the first marker stored in the first marker area to the second storage system, is completed,
the second processor checking whether the first marker stored in the second storage area of the second volume corresponds to a second marker designated by the computer, and
wherein, if transferring the data stored in the first data area and the first marker stored in the first marker area to the second storage system is completed and the first marker stored in the second storage are of the second volume is a second marker designated by the computer, the second processor creating a snapshot of the data that is stored in the second data area, in the third storage volume.

7. A snapshot method according to claim 6, comprising:
wherein when the first processor receives a marker creation request from the computer for creating a marker corresponding to the data stored in the first data area, and the first processor writing the first marker in the first marker area in the first volume.

8. A snapshot method according to claim 6, comprising:
wherein the second processor receiving a local copy start command to command a local copy start for the second storage system, and providing a local copy end report output at a local copy end.

9. A snapshot method according to claim 6,
wherein the second processor checks and waits until a local copy control flag of the data that is stored in the second data area, is a predetermined value, before executing the snapshot.

10. A snapshot method carried out in a storage system including:
a first storage system including:
a first volume storing data sent from a computer;
a first memory storing a first marker which corresponds to the data stored in the first volume; and
a first processor which stores data sent from the computer in the first volume;
a second storage system including:
a second volume;
a third volume;
a second memory; and
a second processor which stores the data sent from the first storage system in the second volume;
the snapshot method comprising operations of:
the first processor transferring the data stored in the first volume in the first storage system to the second storage system, and the second processor stores the data in the second volume,
after the first processor transfers the data stored in the first volume to the second storage system, the first processor transferring the first marker stored in the first memory to the second storage system, and the second processor stores the first marker in the second memory in the second storage system,
wherein the second processor checking whether transferring the data stored in the first data area and the first marker stored in the first memory to the second storage system is completed,
the second processor checking whether the first marker stored in the second memory corresponds to a second marker designated by the computer,
wherein, if transferring the data stored in the first data area and the first marker stored in the first memory to the second storage system is completed and the first marker stored in the second memory is the second marker designated by the computer, the second processor creating a snapshot of the data that is stored in the second data area, in the third storage volume.

* * * * *